(12) United States Patent
Stöcker

(10) Patent No.: US 11,683,368 B2
(45) Date of Patent: Jun. 20, 2023

(54) PRODUCTION SYSTEM CONTROLLABLE BY MEANS OF A PEER-TO-PEER APPLICATION

(71) Applicant: Carsten Stöcker, Hilden (DE)

(72) Inventor: Carsten Stöcker, Hilden (DE)

(73) Assignee: innogy Innovation GmbH, Essen (DE)

( * ) Notice: Subject to any disclaimer, the term of this patent is extended or adjusted under 35 U.S.C. 154(b) by 37 days.

(21) Appl. No.: 16/148,480

(22) Filed: Oct. 1, 2018

(65) Prior Publication Data

US 2019/0037012 A1    Jan. 31, 2019

Related U.S. Application Data

(63) Continuation of application No. PCT/EP2016/057259, filed on Apr. 1, 2016.

(51) Int. Cl.
*H04L 67/104* (2022.01)
*B29C 64/386* (2017.01)
(Continued)

(52) U.S. Cl.
CPC .......... *H04L 67/104* (2013.01); *B29C 64/386* (2017.08); *B33Y 50/02* (2014.12);
(Continued)

(58) Field of Classification Search
CPC ... H04L 67/104; H04L 63/061; B29C 64/386; B33Y 50/02; G06F 3/1203; G06F 3/1273; G06F 3/1282; G06F 3/1285; G06Q 20/223
See application file for complete search history.

(56) References Cited

U.S. PATENT DOCUMENTS 7,656,402 B2 *  2/2010  Abraham ............... G06Q 30/06
                                              345/420
7,688,464 B2 *  3/2010  Lodolo ............... H04L 67/1068
                                              358/1.15
(Continued)

FOREIGN PATENT DOCUMENTS

CN           104203547 A     12/2017
WO      WO 2015/128838 A2 *  9/2015  ......... H04N 1/00188

OTHER PUBLICATIONS

Block-chain: Blueprint for A New Economy, Melanie Swan, pp. 45-47, New Star Press, Jan. 2016.
(Continued)

*Primary Examiner* — Patrice L Winder
(74) *Attorney, Agent, or Firm* — Reinhart Boerner Van Deuren P.C.

(57) ABSTRACT

Disclosed herein are embodiments of a production system. The production system includes at least one production unit configured to produce at least one first product. The production unit has at least one processing tool configured to process at least one starting material supplyable to the production unit in order to produce the first product. The production unit also has at least one peer-to-peer module configured to communicate with at least one peer-to-peer application of at least one peer-to-peer network. The peer-to-peer application is configured to cause transmitting of at least one first control data set to the production unit, and the processing tool is controllable in accordance with the received first control data set.

16 Claims, 6 Drawing Sheets

(51) Int. Cl.
*B33Y 50/02* (2015.01)
*G06F 3/12* (2006.01)
*H04L 9/40* (2022.01)

(52) U.S. Cl.
CPC .......... *G06F 3/1203* (2013.01); *G06F 3/1273* (2013.01); *G06F 3/1282* (2013.01); *G06F 3/1285* (2013.01); *H04L 63/061* (2013.01)

(56) References Cited

U.S. PATENT DOCUMENTS

| | | | | |
|---|---|---|---|---|
| 7,770,004 | B2 * | 8/2010 | Herf | H04L 67/1068 |
| | | | | 713/162 |
| 7,849,203 | B2 * | 12/2010 | Berkey | H04L 67/1068 |
| | | | | 709/229 |
| 8,976,391 | B2 * | 3/2015 | Nanaumi | G06F 3/1292 |
| | | | | 358/1.15 |
| 9,110,608 | B2 * | 8/2015 | Schultz | G06F 21/32 |
| 9,223,527 | B2 * | 12/2015 | Utsumi | H04L 67/10 |
| 9,223,532 | B1 * | 12/2015 | Poirier | G06F 3/1292 |
| 9,229,674 | B2 * | 1/2016 | Tapley | G06F 3/1211 |
| 9,248,611 | B2 * | 2/2016 | Divine | B29C 64/176 |
| 9,588,726 | B2 * | 3/2017 | Webb | G06F 3/1203 |
| 9,740,442 | B2 * | 8/2017 | Hedberg | G06F 3/1292 |
| 9,878,481 | B2 * | 1/2018 | Pappas | B29C 48/865 |
| 9,967,334 | B2 * | 5/2018 | Ford | H04L 67/104 |
| 10,046,521 | B2 * | 8/2018 | Walker | G06F 30/00 |
| 10,180,817 | B2 * | 1/2019 | Ishimura | H04W 76/19 |
| 10,289,369 | B2 * | 5/2019 | Tye | G06F 3/1291 |
| 10,346,406 | B2 * | 7/2019 | Booz | H04L 67/34 |
| 10,354,304 | B2 * | 7/2019 | Stump | G06Q 30/0611 |
| 10,421,238 | B2 * | 9/2019 | Leonard | G06F 30/00 |
| 10,449,732 | B2 * | 10/2019 | Klappert | B29C 64/386 |
| 10,592,985 | B2 * | 3/2020 | Ford | G06Q 20/10 |
| 10,594,689 | B1 * | 3/2020 | Weaver | H04L 9/50 |
| 10,696,038 | B2 * | 6/2020 | Thomas-Lepore | |
| | | | | G05B 19/4099 |
| 10,740,732 | B2 * | 8/2020 | Thomas | G06Q 20/027 |
| 2012/0092724 | A1 | 4/2012 | Pettis | |
| 2012/0287472 | A1 * | 11/2012 | Pettis | B33Y 70/00 |
| | | | | 348/E7.085 |
| 2013/0003126 | A1 * | 1/2013 | Van Osdol | G06F 3/1204 |
| | | | | 358/1.15 |
| 2014/0223583 | A1 * | 8/2014 | Wegner | G06F 3/1238 |
| | | | | 700/98 |
| 2015/0189355 | A1 * | 7/2015 | Korbecki | H04N 21/44008 |
| | | | | 725/12 |
| 2016/0210312 | A1 * | 7/2016 | Webb | G06Q 30/0635 |
| 2016/0297149 | A1 * | 10/2016 | Albert | G05B 19/4099 |
| 2016/0342988 | A1 * | 11/2016 | Thomas | G06Q 20/0855 |
| 2017/0190117 | A1 * | 7/2017 | Dow | H04L 67/104 |
| 2017/0279783 | A1 * | 9/2017 | Milazzo | H04L 63/061 |

OTHER PUBLICATIONS

IBM Business Value Report: Internet Plus, IBM Institute for Business Value, pp. 38-41, Oriental Press, Mar. 2016.
Re-examination Notification, App No. 201680084416.3, Serial No. 2303090104670, China National IP Administration, Mar. 14, 2023, 10 pgs.

* cited by examiner

PRODUCTION SYSTEM CONTROLLABLE BY MEANS OF A PEER-TO-PEER APPLICATION

CROSS-REFERENCE TO RELATED PATENT APPLICATION

This patent application is a continuation of PCT/EP2016/057259, filed Apr. 1, 2016, the entire teachings and disclosure of which are incorporated herein by reference thereto.

FIELD

The invention relates to a production system comprising at least one production unit configured to produce at least one first product, wherein the production unit comprises at least one processing tool configured to process at least one starting material supplyable to the production unit in order to produce the first product. The invention relates further to a method for operating a production system, a production unit, a peer-to-peer application and use of said peer-to-peer application.

BACKGROUND

It is known from prior art production systems to use one or more production units for producing one or more products and components, respectively. A production unit is usually supplied with one or more (different) starting material/s. By way of example, the at least one starting material and starting product, respectively, may be a raw material/product or an intermediate material/product.

A production unit according to the present invention is configured to modify or process the at least one starting material in order to produce at least one modified/processed material and modified/processed product, respectively. The produced material/product may be an end material/product or an intermediate material/product. In order to process a starting material, the production unit may be provided with at least one processing tool. The at least one processing tool may be controllable by a controller. By way of example, the controller may be integrated in the production unit. For instance, the controller can control the processing tool by at least activating and/or deactivating said processing tool.

In particular, in the case of modern production systems, there may be a central control system configured to control the at least one production unit. Usually, a central control system is formed by one or more central server and is coupled with all production units in order to control the production chain. For instance, a plurality of production units might be arranged e.g. within a factory building. The production chain and thus the production units, in particular, the respective controllers of the production units, are centrally controlled and/or configured by the at least one server. Further controllers might control mobile transportation units for inbound and/or outbound logistics, storage units, building automation systems, quality systems and/or communication systems.

In addition to the central systems mentioned above central systems exist with design patterns, design plans (e.g. control data in form of CAD data, 3D print design data, or welding machine data) or software packages (e.g. control data in form of firmware, operating system, client software, APIs) and configuration data (e.g. control data in form of system parameters). Such a system may be configured to store, distribute, provide access and/or sell or trade design patterns, plans, software package or configuration data.

Manufacturing Execution System data, Logistics Telemetry data or Quality data are typically stored and handled by one or more central system(s). In prior art when mapping of asset tracking and shipment tracking data problems with data accuracy or availability occur.

For example, for sensible or dangerous goods additional central systems exist that document proper handling of the goods. In some cases special requirements have to be fulfilled (e.g. "GxP"). Examples for GxP are Good Manufacturing Practices or Good Distribution Practices that are governing handling and documentation of pharmaceutical products. In industries handling sensible or dangerous goods (supply) systems for production, storage and distribution are undergoing validation processes. In the example of cold chain networks for pharmaceutical products GxP requirements are fulfilled by printing and scanning paper. In a manual process a paper is printed out from a cooling device that controls and/or measures the temperature in a mobile cooling transportation unit. This paper will be attached to further shipment documentation and scanned into a central system.

A typical prior art production system is shown in FIG. 1. The production system 100 comprises a factory building 102 and production location, respectively, having three production units 104, 106, 108. Each production unit 104, 106, 108 may comprise at least one (not shown) processing tool and production tool, respectively, controlled by at least one controller. For instance, each production unit 104, 106, 108 can comprise at least one controller in form of a client module (not shown). Alternatively, it comprises one controller for controlling two or more units 104, 106, 108.

As can be seen from FIG. 1, a first starting material 118 can be processed by a processing tool of the first production unit 104. The resulting or modified product 119 is delivered from the first production unit 104 to a second production unit 106. The second production unit 106 processes the received (intermediate) product 119 and, thereby, produces a further intermediate product 121. This intermediate product 121 is forwarded from the second production unit 106 to a third production unit 108 for producing a first (end) product 120.

As can be further seen from FIG. 1, the production units 104, 106, 108 are controlled by a central controller 114 in form of a server 114. By way of example, the production process depends on orders of customers for the first product 120. By way of example, a customer can communicate via a computing device 110 and a network 116 (e.g. Internet) with a further server 112 comprising offers of one or more (different) products, such as the first product provided by a production provider. For instance, the further server 112 may be a marked place for e.g. different products to be produced. After the user has selected a desired product an agreement between the customer and the production provider of the desired product can be generated. Such a production transaction agreement can comprise details about the desired product, delivering date and/or payment conditions.

Then, the respective order can be sent from the further server 112 via the network 116 to the central server 114 of the production system 100 in order to produce the desired first product. The central server 114 may transmit one or more control data sets comprising instructions for the at least one production unit 104, 106, 108 for producing said first product 120. After the first product 120 has been produced the billing of the first product 120 can be carried out by the central server 114 and server 112 (or another additional billing server). Billing can also be done in advance by a central server depending on the terms of an order.

The disadvantage of server-client structures of this kind, particularly the server (or platform), apart from the high transaction costs, is that the central instance or central server manages confidential data. A persistent problem affecting the central instance is that of protecting the confidential data stored on one server/a plurality of servers from access by unauthorized third parties. In particular, a high degree of security expenditure is required, in order to prevent customer data, billing data, forecast data, etc. from being tampered with. This in turn leads to higher transaction costs.

A further disadvantage is the complex and costly infrastructure for providing the described server-client structure.

A still further disadvantage of prior art systems is that production system infrastructure cannot easily be shared and configured for small production quantities in an automated way including provisioning of production system data and performing a billing process (e.g. automated sharing of a 3D printer).

Therefore, the object of the present invention is to provide a production system for producing a product which offers a high level of security in an easy manner.

BRIEF SUMMARY

The object is solved according to a first aspect of the present invention by embodiments of a production system as disclosed herein. The production system comprises at least one production unit configured to produce at least one first product. The production unit comprises at least one processing tool configured to process at least one starting material supplyable to the production unit in order to produce the first product. The production unit comprises at least one peer-to-peer module configured to communicate with at least one peer-to-peer application of at least one peer-to-peer network. The peer-to-peer application is configured to cause transmitting of at least one first control data set to the production unit. The processing tool is controllable in accordance with the received first control data set.

In contrast to the prior art, a production process can be easily performed and controlled—without a central instance—by means of a peer-to-peer application of a peer-to-peer network and a peer-to-peer module comprised by the production unit. Thereby, the peer-to-peer module is capable of communicating with the peer-to-peer application and peer-to-peer network, respectively. By the fact that instead of a central server or a platform, a peer-to-peer network (also called a framework) undertakes the in particular tamper-proof controlling of the production process by means of a peer-to-peer application the production process can be performed more efficient. In the case of a peer-to-peer network, high security standards are achieved in that all computers (peer nodes or simply nodes) in the peer-to-peer network, at least a part of the peer computers in the peer-to-peer network, monitor(s) at least the accuracy of the controlling of the production process. The transaction costs can be significantly reduced. No central, superior platform, server, cloud, etc. is required.

The present production system comprises one or more production units. A production unit according to the present invention is configured to produce or create at least one first product. The first product may be an end product or an intermediate product. An intermediate product may be delivered (as a starting material) to a further production unit.

In order to produce the first product, the production unit comprises at least one processing tool. The processing tool is configured to process at least one received starting material, such as a raw material or an intermediate product. By way of example only, the processing tool may be a cutting tool, an edge tool, a moving tool, such as force-concentrating tool, a tool which enacts physical or chemical changes of a starting material, a shaping tool, a drying or heating tool, and/or a fastening tool.

Furthermore, the production unit comprises at least one peer-to-peer module. Preferably, the peer-to peer module is integrated in the production unit. It is also possible that a communication connection is provided between the production unit and the peer-to-peer module assigned to the production unit. This means that the peer-to-peer module can at least communicate and/or act on behalf of the production unit. For example, the peer-to-peer module can be formed by a separate processing device, such as mobile communication device, or it can run on a remote processing device (e.g. in a data centre). In case of a remote processing device the at least one production unit may have a secure communication channel (and/or the data to be transmitted may be encrypted) to the processing device of the data centre or a server hosting a peer-to-peer module (so called remote peer-to-peer node) and the processing device itself may have a connection to the peer-to-peer network. In an alternative embodiment the remote processing device may be a gateway to the peer-to-peer network. This means that the production unit can securely communicate via its peer-to-peer module and the gateway to the peer-to-peer network.

In comparison to a client-server network in which a server provides a service and a client uses the service, these roles are cancelled in a peer-to-peer network. Each participant of the peer-to-peer network can use a service and the like and offer such a service. In particular, a peer-to-peer network is self-determined and/or self-organized (without any higher-level units). In the present case preferably each computer of the peer-to-peer network comprises a peer-to-peer application. In particular, the peer-to-peer module is configured to communicate, e.g. send messages to the peer-to-peer application and/or read data stored in the peer-to-peer application. The peer-to-peer module may be a peer and node, respectively, of the peer-to-peer network.

The peer-to-peer module is configured to communicate with the peer-to-peer application of the peer-to-peer network. By communicating with the peer-to-peer application the peer-to-peer module may be controllable by the peer-to-peer application. The peer-to-peer application may cause transmitting of at least one first control data set to the production unit. For instance, the peer-to-peer application comprises means, such as a smart contract comprising computer code which can be capable of causing transmitting of at least one first control data set to the production unit.

According to a further embodiment, the at least one peer-to-peer application, in particular, at least one computer code in form of a smart contract of at least one peer-to-peer application may act as a market to search, access, use and/or (eventually) buy a control data comprising data, such as at least one of the following data sets: design pattern, production design, software packages, configuration data or other design. Encrypted control data sets may be preferably securely exchanged and/or streamed to a production unit (or other unit) for the purpose of producing a specified number of items. A payment for the use of e.g. intellectual property rights for the at least one control data set can be controlled and/or done based on the number of actually produced items by means of the peer-to-peer application. The actual control data can be stored in a decentral file system or distributed data base such as BigChainDB.

By way of example, the peer-to-peer application can directly transmit the first control data set to the peer-to-peer module of the production unit. This may mean that the peer-to-peer module reads said first control data from the peer-to-peer application. Alternatively and/or additionally, the peer-to-peer application can cause the peer-to-peer module of the production unit to retrieve the first control data set from a (remote) data storage. For instance, based on a received or read message of the peer-to-peer application, the peer-to-peer module can directly access said data storage or cause a further communication module of the production unit to access said data storage. Alternatively and/or additionally, the peer-to-peer application can cause e.g. said data storage to transmit the first control data set to the production unit, e.g. to the peer-to-peer module and/or the further communication module.

For instance, the transmission can be caused after a positive verification check of the production unit performed by means of the peer-to-peer application and by at least a part of the nodes of the peer-to-peer network.

Then, the first product can be produced in accordance with the first control data set. The first control data set may comprise at least one instruction, such as an activation instruction for activating the at least one processing tool (at a particular time) and/or a deactivation instruction for deactivating the at least one processing tool (at a particular time). In particular, the processing tool is configured such that it processes the starting material in accordance with the first control data set. It may be possible that the production unit comprises a controller capable of controlling the processing tool based on the received first control data set and e.g. further control data e.g. incorporated in a storage of the production unit.

The list of all (anonymised) participants or units of the peer-to-peer network of the production system can preferably be made known to each participant, so in particular to each unit of the production system, as a peer-to-peer identification, e.g. in the form of a communications address.

A peer-to-peer module can be at least partially formed by a software module and/or at least partially formed by a hardware module. For instance, the software may be running on top of a controller hardware which is part of a production system comprising productions logistics, storage, quality or building automation system.

According to a first embodiment of the present invention, the peer-to-peer application may be configured to cause transmitting of the first control data set to the production unit based on a production transaction agreement stored in the peer-to-peer application. A production transaction agreement may be generated about the production of the first product. The production transaction agreement may at least comprise the first control data set (required for producing the first product) and/or a first location information (e.g. a link or the like) about the storage location of the first control data set. In addition, the production transaction agreement may comprise identification information about the at least one production unit selected for producing the first product. Based on these information, the first control data set can be transmitted to the (selected) at least one production unit, e.g. as described above.

For instance, the generation of a production transaction agreement can be caused by a peer-to-peer module. For instance, at least one peer-to-peer module of a computing device or unit of a customer can be configured to cause a generation of a production transaction agreement. For instance, said peer-to-peer module of the computing device and a peer-to-peer module of a further computing device of e.g. a provider of the production unit can cause the generation of a production transaction agreement by means of the peer-to-peer application. The production transaction agreement may comprise further details about the production of the at least one first product, as described hereinafter.

Furthermore, preferably the production system may comprise an in particular decentral file storage (DFS) or decentral file system (such as Interplanetary File System (IPFS)) configured to store at least the first control data set.

In addition a production system may comprise a distributed block chain database such as BigChainDB. The advantages of the immutable distributed block chain database are that the data are immutable and any units or smart contracts or user in the production system can run queries to analyse data and further optimise and automate a process.

Data stored either on a decentral file storage or a distributed block chain database may be encrypted. The peer-to-peer application, such as a block chain, is then used to facilitate access management to the data by handling the encryption keys.

The first control data set may comprise one or more instruction(s) for at least one production unit to produce the first product. Control data can include instructions to use or download (via a smart contract market) design patterns, production designs, software packages or configurable system parameters, customisation parameters provided by the customer (e.g. customer requirements) or other data to specify and produce the product. The access to the first control data set may be controlled by the peer-to-peer application. The advantage of a decentral file storage controlled by the peer-to-peer application is in particular that not all data has to be directly stored in the peer-to-peer application. The peer-to-peer application may be configured to cause the decentral file storage to transmit particular data, such as the first control data set, to one or more particular units and/or peer-to-peer application may be configured to allow one or more particular units access to particular data, such as the first control data set. Preferably, a plurality of different control data sets can be stored in the decentral file storage wherein each of the stored control data sets may comprise at least one specific instruction for producing a specific product. It shall be understood that a control data set may depend on the type of production unit(s) and/or may comprise one or more subsets for one or more production units (or other units) involved in the production process of the first product.

According to a preferred embodiment of the production system of the present invention, at least the first control data set may be encrypted by at least one first encryption key. The peer-to-peer application may be configured to cause transmitting of at least one first access key corresponding to the first encryption key to the peer-to-peer module of the production unit based on a generated production transaction agreement. The peer-to-peer module may be configured to access the first control data set based on the received first access key. In order to prevent unauthorized access to one or more control data set(s), preferably all control data sets may be (individually) encrypted. The access to a specific control data set can be controlled by the peer-to-peer module. Preferably, based on a generated production transaction agreement, only the at least one production unit involved in the production process can be provided with the at least one first access key required to produce the at least one first product.

Besides one or more production units, the production system may preferably comprise at least one further unit having a different function than the at least one production unit. According to an embodiment, the production system may comprise at least one of:

a mobile transport unit configured to transport at least the starting material and/or the first product, a storage unit configured to store at least the starting material and/or the first product, a quality monitoring unit configured to monitor at least the quality of the starting material and/or the quality of the first product, a building automation unit configured to control at least one building function.

A mobile transport unit may be any unit capable of transporting a material and product, respectively. By way of example, a mobile transport unit may be a vehicle, such as car, truck, ship, railway vehicle, plane, bicycle, drone, mobile machine, etc. A mobile transport unit may also be configured to transport a person e.g. required for operating a particular production unit.

A storage unit may be configured to (intermediately) store a material or product, such as a starting material, intermediate product or end product.

Further, a quality monitoring unit may be configured to check, e.g. by measuring, the quality of a material or (produced) product. For instance, a status of the material or product can be checked. A quality monitoring unit can be e.g. configured to conduct at least one (function) test of the (produced) product. A quality monitoring unit can be part of a production unit, transportation unit, storage unit and/or building automation unit.

The building automation unit configured to control access to at least a part of a building and/or to control at least one physical parameter of the building, such as temperature, humidity during the production process.

One or more gateways can be installed along the production chain of a production system. A gateway may be configured to gather data from the flow of material or goods along said chain. The data may be gathered e.g. by barcode scanner, RFID reader, etc. A gateway can be preferably equipped with a peer-to-peer module. This enables to measure data within the production chain and store this data in the peer-to-peer application, such as a (decentral) file system or in BigChainDB. The stored data can be used for tracking and system control purposes.

Furthermore, according to a preferred embodiment, the at least one mobile transport unit may comprise at least one peer-to-peer module configured to communicate with the at least one peer-to-peer application. The mobile transport unit may be controllable by means of the peer-to-peer application.

Alternatively or additionally, the at least one storage unit may comprise at least one peer-to-peer module configured to communicate with the at least one peer-to-peer application. The storage unit may be controllable by means of the peer-to-peer application. The peer-to-peer module of the storage unit may be configured to transmit at least a part, preferably, all stock information of the associated storage unit and items stored therein to the peer-to-peer application. Exemplified stock information may include item identification(s), physical dimension(s) of storage unit and/or item(s), location of storage unit and/or item(s), physical conditions of the storage (e.g. temperature and/or humidity), storing date of one or more items, (planned) release data of one or more items, status of one or more item(s) (e.g. damaged) as well as free space information of the storage unit e.g. including location storage information.

Preferably, each storage unit may transmit/write at least a part of the stock information to the peer-to-peer application by means of the respective peer-to-peer module. This has the advantage that the information of a plurality of storage units can be accessed and managed via the peer-to-peer application. The peer-to-peer application can be used as a distributed "shared stock information system". Therefore entities, such as units (e.g. machines) or users, have full transparency about supply in storage units of products and material. This has the advantage that storage space can be used much more efficiently. Required raw material(s) and/or product(s) can be accessed much more quickly. Storage location(s) can be optimised for faster access based on historic and forecast data. The interaction with the shared stock information system can be automated via e.g. at least one smart contract of the peer-to-peer application. Priorities and/or flexibilities in storage unit(s) can have different prices or even be traded.

So called transportation, storage and/or building automation telemetry data can be stored in the peer-to-peer application or a (decentral) file system or in BigChainDB for tracking and system control purposes.

In a further embodiment, by means of the at least one peer-to-peer application, a process for handling telemetry data for sensible and dangerous goods can be established. For instance, as described above, physical and/or chemical condition(s) of a product or the environment of the product can be measured. The measured data can be provided with timestamps and/or hashes signed by the at least one sensor measuring the physical and/or chemical condition(s). This data can be stored in accordance to GxP requirements. The data can be encrypted. This has the advantage that GxP compliance can be achieved with a decentral system without the need of handling paper (higher degree of automation). Also the GxP data handling can be decoupled from other system(s). The decoupling may make validation of the system easier. In the above mentioned prior art example of cold chain networks for pharmaceutical products GDP requirements are fulfilled by reading the temperature data, signing and hashing and eventually encrypting the temperature data and storing the data in the P2P application.

Alternatively or additionally the at least one quality monitoring unit may comprise at least one peer-to-peer module configured to communicate with the at least one peer-to-peer application. The quality monitoring unit may be controllable by means of the peer-to-peer application. Preferably, all units involved in the production of a first (end) product can be controlled by the peer-to-peer application of the peer-to-peer network. For instance, a generated production transaction agreement can comprise information about all units involved in the production of a first end product. Hence, it is possible to control the complete production process for producing the first product by means of a peer-to-peer application without the need of a central instance. These quality data can be stored in the peer-to-peer application, a (decentral) file system or in BigChainDB for tracking and system control purposes.

It shall be understood that the production system may comprise (additionally or alternatively) other units, such as fixed transport units, generation units, etc. Each of the units may comprise a peer-to-peer module. Further, as explained above, "comprise" means that the peer-to-peer module is integrated in the respective unit or that that communication channel can be established with a (remote) peer-to-peer module assigned to the respective unit. Further, controlling a unit means that at least one function of the unit can be controlled.

According to a preferred embodiment of the production system according to the present invention, the production unit may comprise at least one sensor (including e.g. measurement device(s) or optical system(s)) configured to detect at least one status parameter regarding the production process of the first product. A status parameter may be any parameter which comprises information about the status of the production process of a first product. For instance, the status parameter may be a status of the one or more unit/s involved in the production of the first (end) product. The status parameter may be a (current) operating status (e.g. active or not active) or a machine status of the at least one production unit. Further examples may be a current position/status of a processing tool, the (current) progress of the processing of a starting material, etc. by a producing unit. The peer-to peer module of the production unit may be configured to transmit at least the detected status parameter to the peer-to-peer application. The peer-to peer module may be coupled to the at least one sensor. The parameter values provided by the sensor to the peer-to peer module can be written into the peer-to-peer application. A customer of said first product can be informed about the process status in an easy manner.

According to a preferred embodiment of the production system according to the present invention, the at least one production system may comprise at least one actor configured to trigger a physical event regarding the production process of the first product. The at least one processing tool may be an actor. E.g. start or stop a process step or provide access to other (production) units. An actor can also be configured to initiate an emergency process to halt a production process because of detection of a foreign object in the production/supply system, malfunction of a device or predicted damages of units in the system. Conditions and parameters for the actors may be managed by the peer-to-peer application.

Preferably, all units of the production system may comprise one or more (different) sensor(s) for detecting at least one status parameter. For instance, a mobile transport unit may comprise a location sensor, such as GPS sensor (or the like). The current position of a mobile transport unit can be (regularly) transmitted to the peer-to-peer application. A further sensor may be provided for detecting the current transported load. A storage unit may at least comprise a sensor for detecting the current inventory of the storage unit. A quality testing unit may comprise a sensor for detecting whether the respective unit is currently conducting a test or the like.

Activities of the actors and/or data of sensors may be stored in the peer-to-peer application. For instance, sensor(s) can either deliver a constant data flow or they provide measuring data based on a measurement request. The data stored from sensor(s) and/or actor(s) can be accessed via the peer-to-peer application for e.g. tracking, optimisation, operational performance, (predictive) maintenance, GxP validation, HSE, reporting purposes. Analysis and optimisation of the data can be done on- or off-chain. A peer-to-peer application is facilitating the identity and access management as well as off-chain computing and feeding the results of off-chain computing back into the supply system.

What is more, according to a particular preferred embodiment, at least one of the nodes (preferably at least a plurality of the nodes) of the peer-to-peer network may be configured to evaluate the at least one transmitted status parameter. Preferably, all status parameters can be evaluated by at least a part of the nodes of the peer-to-peer network. The peer-to-peer application may be configured to control at least the production unit based on the evaluation result of the at least one transmitted status parameter. For example, at least a part of the nodes of the peer-to-peer network can evaluate the at least one process parameter whether the current production transport, storage and/or quality process is conducted in accordance with a generated production transaction agreement which might include quality or service level requirements.

According to a further embodiment, the peer-to-peer application can be configured to control the maintenance of one or more production units and/or other units based on the at least one status parameter. In particular, at least one of the nodes (preferably a plurality of the nodes) of the peer-to-peer network may be configured to evaluate—based on one or more detected status parameters—whether maintenance or replenishment of a specific unit or tool of a unit is required. The peer-to-peer application may be configured to initiate suitable measures based on the evaluation result.

Further, according to an embodiment, already existing systems/programs can be included in the present production system. For instance, Manufacturing Execution System (MES) or SCADA data can be gathered via interface(s) in single units of the production systems. The one or more interface(s) can be connected to a peer-to-peer module in order to transmit said data to the peer-to-peer application.

According to a further embodiment, the peer-to-peer module of the production unit may be further configured to receive a unique product identification code from the peer-to-peer application. The production unit may comprise at least one identification applying tool configured to provide at least the first product with the received unique product identification code. This allows providing each generated with a unique identification. The identification may be barcode, three-dimensional code or a digital code storable in a storage (RFID chip or stored in printed electronics) which can be attached to or integrated into the produced product. For attaching the identification to the product, digital ink can be used. Alternatively or additionally, the identification can be stored in the peer-to-peer application.

According to a further embodiment, e.g. after the production of a first product and e.g. after the identification has been tagged to the first product, the peer-to-peer application may register the first product with its identification in the peer-to-peer application (as a so called smart asset). Preferably, the peer-to-peer application can set-up a smart contract for the product on the peer-to-peer application. Access and ownership can be governed by the smart contract. The product can be sold and the new owner gets at least one key to access the product via the smart contract.

In a preferred embodiment the product can be provided with a peer-to-peer module. The product may be able to localise itself e.g. via a GPS sensor or another localisation means (e.g. network address). The product can then publish its location to the owner via a smart contract or by sending encrypted location data to the owner via the peer-to-peer application.

In a further embodiment of the invention a production unit may comprise means to establish a first product having a so called "Wake on Internet" function. A "Wake on Internet" may function similar to "Wake on LAN" in today's LAN networks. In this case the product has a communication module and further one or more electric modules that are controlling the product. The communication module is in a "Wake on Internet" and listening if it is activated by a specific data package sent to the communication module. All other functions are deactivated. One or more of these functions may be only activated by the communication module if it receives the activation code. The activation can only be done by the owner of the product who has the valid activation code. This code can be securely provided via smart contract transactions and by means of encryption. It shall be understood that the same method is applicable for other networks (such as private company networks, or VPN).

In a further embodiment, the communication module can be found by a device search service, such as Shodan[dot]io. A device search service may scan the public internet and identifies products/devices including a product identification (and maybe some system parameters) and their IP addresses. This means an owner of the product can find the identification of his bought product via device search service which returns the IP address. The owner can communicate with the device and maybe send an activation code (in case of "Wake on Internet)" or send a request to the device to communicate its location. This communication can be done encrypted and/or signed to confirm the owner ship towards the device (Authorisation).

In a further embodiment when a smart contract is created by the peer-to-peer application for a produced first product, the product can be activated, used and/or shared by other entities, such as users or machines, directly after the product has been produced. This is particularly important for gathering data from the product or controlling the product right after it has been produced.

In addition, storing of production chain, production and quality data can be orchestrated via a smart contract of the peer-to-peer application. This means an entity, such as an operator of the production system or a new owner or other machines, can access the data already during the production process.

Preferably, the unique product identification code can be generated by means of the peer-to-peer application. For instance, based on an (unique) identification relating to the customer of a specific product, such as the first product, and/or an (unique) identification relating to the production provider and/or one or more (unique) identification/s of the units involved in the production process of said product, a unique product identification code can be generated by the peer-to-peer application. Such a code may also allow (uniquely) identifying e.g. the (first) owner of a product, the at least one production provider and/or the one or more units involved in the production process.

In addition, the production system may further comprise at least one transporting box having at least one locking module configured to lock the transporting box. The transporting box may be configured to receive at least the first product. The locking module may comprise an interface module configured to receive a release information provided by the peer-to-peer application causing the release of the locking module.

According to a further embodiment, the production transaction agreement can comprise at least one product delivery condition. At least a part of the peer-to-peer network can be configured to verify the fulfilment of the delivery condition such that the delivery of the product and/or the release of the locking module of the transporting box comprising said product is/are only performed upon a positive verification of the delivery condition. In order to increase the security of the exchange of a produced product between a production unit/provider and a further entity of e.g. a customer of said product, the actual delivery of the product can depend on a previously agreed delivery condition (e.g. who is authorised to unlock the locking module of the transporting box). The fulfilment of the delivery condition can be preferably performed by means of the peer-to-peer application. By way of example, the delivery condition can be a given amount, particularly of a cryptocurrency (or a fiat currency) which must be transferred from one entity of e.g. the customer to another entity of e.g. the production provider. The specified amount can be transferred to the other entity within the framework of e.g. a transaction criterion transaction by means of the peer-to-peer network, in particular the peer-to-peer application. For instance, unique keys of the involved entities can be used for verification for this transaction. The keys and, in particular, the actual possession of the amount by an entity can be checked by the peer-to-peer network, for example. Secure payment can be made by means of a peer-to-peer network without a central instance. Transaction costs can be further reduced. After the positive verification of the transfer of the specified amount by at least a part of the peers of the respective peer-to-peer network, the delivery of the product can be finalized. For instance, the at least one mobile transport unit for delivering the product can be controlled by the peer-to-peer application such that the product is delivered to an agreed location.

The locking module can comprise an interface module configured to receive a release information causing the locking module to unlock the locking module in order to remove the product from the transporting box. The locking module can preferably prevent the removal of the product until a receipt of a release information. The product can be enclosed by the physical transporting box. In order to remove the product, the locking module has to be opened (e.g. by entering a password and/or identification). Then, the product can be removed from the transporting box e.g. to use it according to its intended use.

The locking module of a transporting box may be preferably provided with an interface module. The interface module can be a user interface module enabling a manual input of the release information. Alternatively or additionally, the interface module may enable to receive a release information from another device, such as a scanning device. Another example can be a network interface for a mobile and/or wired network, such as an internet interface module. After receipt of a release information caused by a positive verification of at least a part of the peers of the respective peer-to-peer network, the locking module can unlock the transporting box. Alternatively or additionally a release request can be signed with the ID of a recipient. In case of positive verification of the ID and a check if the recipient's ID is authorised in accordance to a delivery condition to receive the product/unlock the transporting box, the locking module can unlock the transporting box.

In a particular preferred embodiment, the peer-to-peer application can be configured to generate the release information upon the positive verification of the delivery condition. The interface module of the locking module can be a peer-to-peer interface module configured to receive the generated release information from the peer-to-peer application. In other words, the locking module can comprise a peer-to-peer interface module configured such that at least particular information (at least the release information for said product) can be obtained or read from the peer-to-peer application of the peer-to-peer network.

According to a further embodiment, the peer-to-peer application can be a decentralized register or a shared database storing transaction and data with given certain proofs or signatures. In addition to transactions and data, the decentral register can store computer code that can be invoked by a transaction to the address of the code in so called 'smart contracts'. This code is processes on the nodes of decentral register.

A decentralized register can be readable at least by a part of the participants of the peer-to-peer network. In particular, every computer node including e.g. the first peer-to-peer module and/or the second peer-to-peer module can comprise the peer-to-peer application. The decentralized register may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. A message or transaction send to a smart contract will start the execution of the code of the smart contract while using data stored in the smart contract.

The peer-to-peer application can be built upon the following elements: P2P network, Consensus System/Protocol, Data Structure, Merkle Trees, Public Key Signatures, Byzantine Fault Tolerance. It replicates data based on a consensus principle. It is auditable and traceable.

In a simple way information can be made available to preferably all participants. This allows to carry out a review of the information stored in the decentral register or the code executed in the decentral register. Particularly preferably, each computer in the peer-to-peer network can be configured to review new information, in particular based on older information stored in the peer-to-peer application.

Moreover, preferably each computer can in each case comprise the complete data content, but include at least a portion of the data contents of the peer-to-peer application, in particular of the decentral register. For example, it may be provided that after a positive verification of written information in the peer-to-peer application this information is saved by all computers, at least by a part of the computers. The tamper resistance of the data stored in the peer-to-peer application can thereby be further improved.

In order to store new information in a tamper-proof way, the peer-to-peer application can comprise encryption means and/or signature means and/or verification means, wherein at least one of the encryption means and/or signature means and/or verification means is configured to store data, such as a production transaction agreement or control data. In particular, it can be provided that by the hash function a link is established with at least one previously stored information in the decentral register. Further data, such as request messages, ordinary, contextual and/or transaction data of an entity, such as a production unit or any other unit, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present system, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, at least the correctness of a production process can be checked without the need of a central server. In addition, the block chain can be used to generate e.g. an production transaction agreement caused by at least the peer-to-peer module in a tamper-proof manner. The block chain according to the present embodiment is particularly a decentralized, peer-to-peer-based register in which all data related to a production process and other messages sent be peer-to-peer modules can be logged. A block chain is particularly suitable as a technical means to replace a central entity/server in a simple and secure manner.

In alternative embodiments of the peer-to-peer application the block chain can be a permissionless or permissioned block chain. In a specific case the block chain can be public, consortium or private block chain.

In a further embodiment the peer-to-peer application can be formed by multiple block chains which are connected via mechanisms such as side chains or smart contracts.

Data of the peer-to-peer application can be stored on the "decentral ledger technology" and/or the de-central ledger steers (encrypted) data storage accessible via the internet and preferably in de-central data storage entity such as Interplanetary File System (IPFS) or in a distributed block chain database (BigChainDB). Access to the encrypted data to third party entities is managed via identity and access management transactions or smart contracts via the block chain.

In addition, data feeds can be provided by the peer-to-peer application (so called smart oracles, e.g. information about prices, weather, etc.). Data can be captured from trusted sources off-chain and stored on the block chain or stored via the block chain on a decentral data storage entity.

Information among peer-nodes can be exchanged by a peer-to-peer messaging system. This means a peer node can send a message to another peer node to submit information or to trigger an action. Messages can be clear text, signed and/or encrypted. This means that not all data exchanged among peer nodes must be stored on the block chain.

In a further embodiment, the at least one peer-to-peer network can be formed by a plurality of computer nodes and a peer-to-peer module, such as the peer-to-peer module of the production unit, of a mobile transport unit, etc., is only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called remote node) in order to communicate with the peer-to-peer network. This allows reducing the required processing power of the peer-to-peer module.

In one implementation of the peer-to-peer network there can be only one validating peer or full node, e.g. only one node can be configured to perform a validation process, and one or more observing nodes. An observing node can validate transactions to establish a trust level but do not validate all transactions which is done by the validating peer.

In an alternative embodiment, the peer-to-peer module is one of the computer nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called light node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, transactions or the measured quantity parameter to the peer-to-peer application via the API. The decentral application so called Dapp is at least configured to process and transmit the meter data.

Preferably, the data is signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Further processing of data can be done on-chain or off-chain. Off-chain data processing, evaluating and/or validation can be managed by the peer-to-peer application, like the code on the block chain. Powerful means in particular a high computing power. In other words, in the present case a valid entry in the peer-to-peer application, such as a block chain, is assumed if (only) a part of the peers comes to a positive result. It shall be understood that only a single, especially particularly powerful peer can perform the processing or validation process. In an alternative embodiment the block chain may delegate computing tasks to one or more resources. It either trusts one resource or it applies a consensus principle while delegating similar processing tasks to many resources.

Data and transactions stored on the block chain do not provide "transactional privacy". Transactions between pseudonyms are (often) stored in clear text on the block chain. In some cases data stored on the block chain are encrypted and the keys are handled via the block chain. Privacy preserving, secure transactions or execution of computer code can be achieved with cryptographic tools such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by a set of nodes, off-chain computers or done in measured launch environment or a secure HW enclave for attestation and sealing that cannot be manipulated by other software code running on the devices. In an alternative embodiment secure Multi-Party-Computing (sMPC) systems can be used for transactional privacy. Examples for privacy preserving protocols and computation are HAWK and MIT Enigma.

With zero knowledge proof (zk Proofs) the parties can see that the algorithm is executed correctly in a private contract, but the input data are not disclosed to the party.

Similarly, in an alternative (not shown) embodiment a particularly large peer-to-peer network may be divided in two or more (physical or logical or dynamically virtual) clusters. In a corresponding peer-to-peer network, for example, a validation will only be carried out by the members of one cluster (e.g. sharing of a block chain to improve the scalability). In a further embodiment the peer-to-peer application can be formed using multiple block chains. These block chains are connected via frameworks such as sidechains.

Financial values can be (instantaneously) exchanged with a transaction via a cryptocurrency. In an alternative embodiment micropayment channels are used for a constant payment stream that can be handled party off-chain to reduce the amount of on-chain transactions. In a further embodiment so called state channels are used to exchange digital tokens off chain. According to the present invention, a man-in-the-middle is not necessary. Fully automated processes from authentication to charging and billing can be provided.

In a further embodiment, at least one unit of the production system may have a digital wallet to exchange value in form of digital tokens and/or cryptocurrency.

In a further embodiment, at least one financial and/or physical transaction among at least two entities, such as units, machines and/or users may be secured via at least one smart contract. A transaction may invoke the execution of the smart contract. With this transaction a deposit or escrow in form of a cryptocurrency is stored in the smart contract by the entity that orders a product. The entity may send a signed confirmation to the smart contract when it has performed the activity. The deposit will be send to a unit of a production system when it has performed the activities defined in the transaction agreement and/or it receives the signed confirmation message (or in accordance to any other payment conditions defined in the transaction agreement). At the end of a production process all remaining funds will be sent back to the entity that provided the deposit. In case quality or service level requirements will not be fulfilled parts or the full deposit will be returned. In addition payment condition (s) such as positive acceptance testing or trial periods can be implemented in the smart contract logic as well. Overall the smart contract provides a secure and transparent payment process with no middle man involved.

A further aspect of the present invention is a method for operating a production system, in particular, a previously described production system. The method comprises:
 causing, by at least one peer-to-peer application, transmitting of at least one first control data set to at least one production unit, and
 processing at least one starting material by at least one processing tool of the production unit in accordance with the received control data set in order to produce at least one first product.

A further aspect of the present invention is a production unit, in particular a 3D printer. The production unit comprises at least one input configured to receive at least one starting material. The production unit comprises at least one processing tool configured to process the at least one starting material in order to produce at least one first product. The production unit comprises at least one peer-to-peer module configured to communicate with at least one peer-to-peer application of at least one peer-to-peer network. The processing tool may be controllable in accordance with at least one received first control data set. The transmission of the first control data set is causable by the peer-to-peer application.

3D printing, also known as additive manufacturing (AM), may refer according to the present application to various processes used to synthesize a three-dimensional product. More particularly, a 3D printer may be configured to process a starting material by forming successive layers of the starting material to create the product. The at least one processing tool e.g. in form of a printer nozzle set may be controlled by a controller of the 3D printer unit. The producible first products can be of almost any shape or geometry. The controller may receive a first control data set of a 3D model of the first product to be produced. Based on such a control data set, the controller can control the processing tool such that the desired 3D product corresponding to the 3D model of the control data set is produced. The present 3D printer may be a type of industrial robot.

Another aspect of the present invention is a peer-to-peer application. The peer-to-peer application comprises means for causing transmitting of at least one control data set to at least one production unit, in particular, a previously described production unit. The peer-to peer application can preferably comprise means for controlling further units, such as at least one further production unit, at least one mobile transport unit, at least one storage unit and/or at least one quality monitoring unit.

A still further aspect is a use of a previously described peer-to-peer application for controlling at least one production unit, in particular, a previously described production unit.

The features of the methods, systems or networks, devices, units, modules and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION

Figure 1:
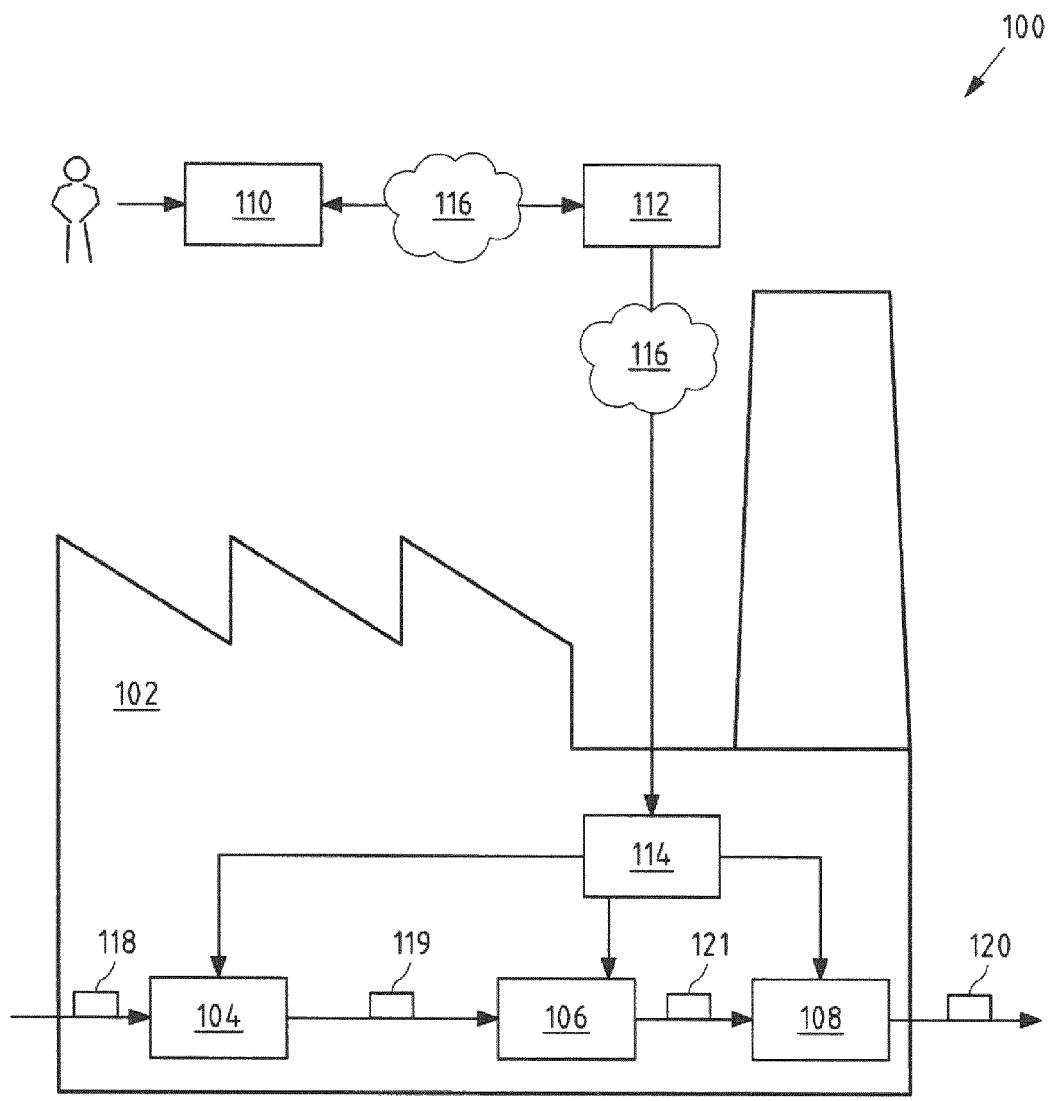
FIG. 1 is a schematic view of an embodiment of a production system according to prior art.

Like reference numerals in different figures indicate like elements.

Figure 2:
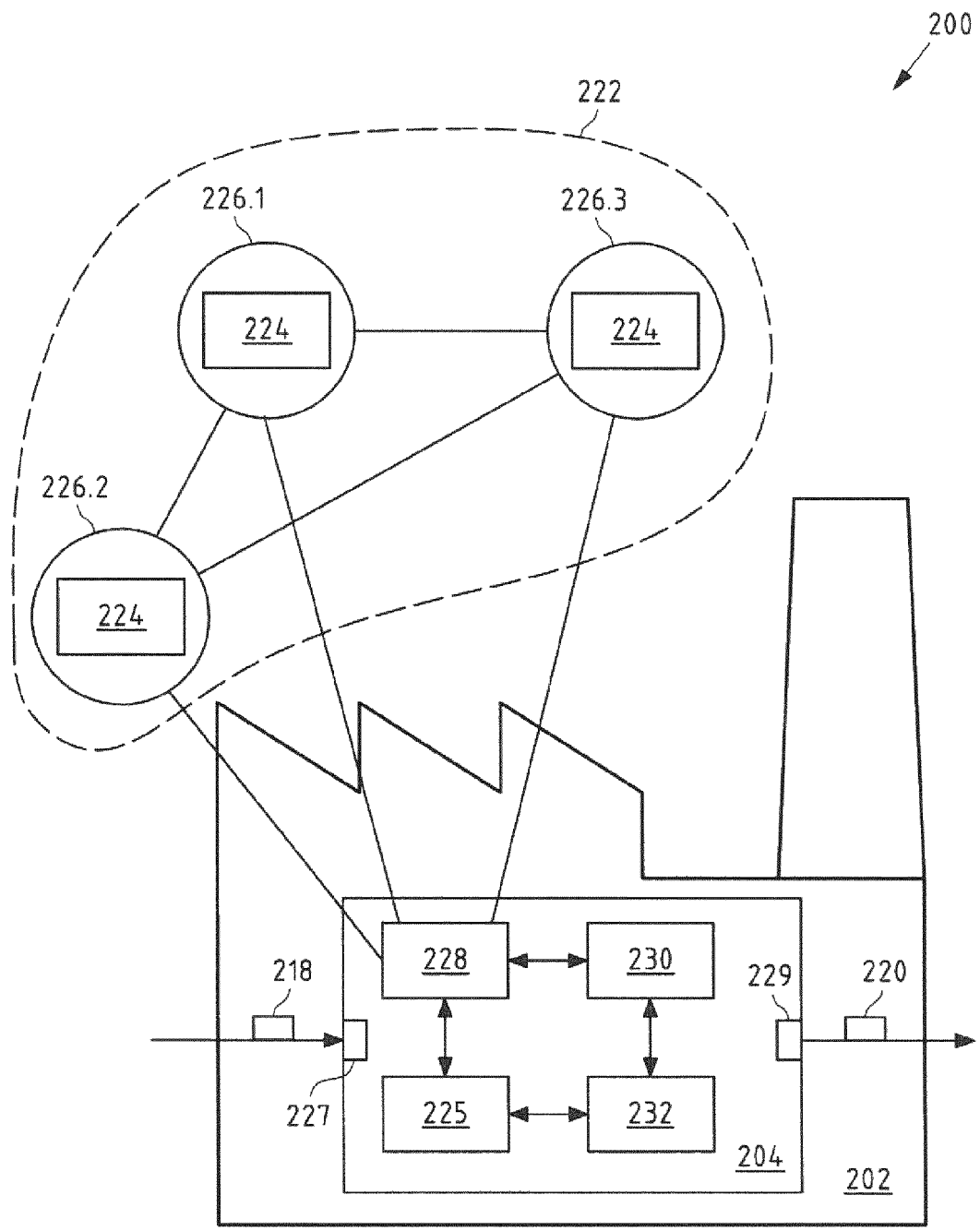
FIG. 2 is a schematic view of a first embodiment of a production system according to the present invention.

FIG. 2 shows a first embodiment of a production system 200 according to the present invention. The system 200 may also be called a smart factory system 200. As can be seen from FIG. 2, in e.g. a factory building 202 or production location 202, at least one production unit 204 is arranged. The production unit 204 comprises at least one input 227 and at least one output 229. A starting material 218, such as a raw material or intermediate product, can be supplied to the production unit 204 via the at least one (material) input 227. The produced first product 220 can be output via the at least one (product) output 229.

The production unit 204 comprises at least one production tool 232 configured to process or modify the starting material 218 in order to produce the first product 220. The first product 220 may be an end product or an intermediate product. An intermediate product can be further processed. In other words, a produced intermediate product may be a starting material of a further production unit.

A production tool 232 may be any tool which modifies or processes the status of a starting material 218. By way of example only, the at least one production tool 232 may be a cutting tool, an edge tool, a moving tool, such as force-concentrating tools, a tool which enacts chemical changes of a starting material, a shaping tool (e.g. molds, jigs, trowels), heating tool, a coloring tool and/or a fastening tool (e.g. welders, lasers, rivet guns, nail guns, or glue guns). A tool can also be an assembly line (e.g. for assembling electronic components, sensors and/or actors; SMD assembling automate). It shall be understood that a tool may be combination of the previously stated tools and/or other tools comprising e.g. simple machine tools, including wheel, pulley, inclined plane, wedge and/or screw.

It shall be understood that a tool can be robotic automate, such as 3D printer, assembling robots and robotic process automation systems and self-configuring robots. It shall be understood that a tool can be an electronic interface that deploys software on a product or configures the software of a product. A tool can be stationary or mobile. Example of a mobile tool is a large scale automated welding machine for house building.

The present production unit 204 comprises a (internal) controller 230 configured to control the at least one processing tool 232. The controller 230 is at least configured to activate and/or deactivate the processing tool 232. Preferably, the controller 230 can set further production control parameters depending on the type of the processing tool 232. For instance, in case of a heater, set temperature value/s can be provided. In the case of a printing tool, print control data can be provided.

A substantial difference compared with prior art production systems, such as system 100 according to FIG. 1, is that no central instance is provided. In the present case, the production system 200 comprises a peer-to-peer network 222 or a computer-computer network 222. The peer-to-peer network 222 comprises a plurality of nodes 226.1, 226.2, 226.3 or computers 226.1, 226.2, 226.3. A peer-to-peer network 222 is characterized in the present case in that each node 226.1, 226.2, 226.3 and/or participant 228 is preferably connectable to every other node 226.1, 226.2, 226.3 and/or participant 228. For instance, at least one physical standard network (wireless and/or cable) can be used for connection.

In addition, the computers 226.1, 226.2, 226.3 have equal rights, something which distinguishes them from a server-client structure.

The depicted nodes 226.1, 226.2, 226.3 (each) comprise a peer-to-peer application 224. As can be seen from FIG. 2, the same peer-to-peer application 224 is implemented on each node 226.1, 226.2, 226.3. The peer-to-peer application 224 may preferably be a public register 224 that can, in particular, be inspected by all participants 226.1, 226.2, 226.3, 228 (not only the nodes 226.1, 226.2, 226.3) of the peer-to-peer network 222. Each node 226.1, 226.2, 226.3 preferably has the (entire) public register 224. It may also be envisaged that only part of the register can be provided on a node (light node). In a particularly preferred embodiment, the peer-to-peer application 224 may be a block chain 224 which will be explained in more details hereinafter.

In addition, it can be seen from FIG. 2 that in the present embodiment the at least one production unit 204 comprises a peer-to-peer module 228. A peer-to-peer module 228 is (generally) configured to communicate at least with the peer-to-peer network 222, i.e. the nodes 226 of the peer-to-peer network 222. In other words, the peer-to-peer module 228 or the unit/entity 204 corresponding to the respective peer-to-peer module 228 is at least a participant of the peer-to-peer network 222. Preferably, all participants 226.1, 226.2, 226.3, 228 (including all nodes) of the peer-to-peer network 222 are known to each participant 226.1, 226.2, 226.3, 228 of the peer-to-peer network 222.

In the present case, the at least one peer-to-peer module 228 is not a node of the peer-to-peer network 222 but only a participant 228. While the nodes 226.1, 226.2, 226.3 or computers 226.1, 226.2, 226.3 in the peer-to-peer network 222 comprise at least a part of the peer-to-peer application 224 a participant of a peer-to-peer network, like the present peer-to-peer module 228, does not comprise the peer-to-peer application 224. Such a peer-to-peer module 228 is configured to provide access to the peer-to-peer application 224 e.g. via an API. Each peer-to-peer module (also a node) may comprise a decentral application and at least an API. In the case, the peer-to-peer module is formed as a node, the peer-to-peer module (also) comprises at least partly the peer-to-peer application 224.

Furthermore, the production of at least one first product 220 through the production unit 204 is controlled by means of the peer-to-peer application 224 and the peer-to-peer module 228. In particular, the peer-to-peer application 224 can e.g. generate and at least provide at least one first control data set to the peer-to-peer module 228. The first control data set comprises at least one instruction for producing the at least one first product 220. For instance, based on the provided control first data set, the controller 230 is capable of controlling the at least one production tool 232.

By way of example, the first control data set can at least comprise activation and/or deactivation time points. According to this instruction/s the controller 230 can activate and/or deactivate the at least one production tool 232. It shall be understood that a control data set can comprise further instructions which defines the action/s to be conducted by the tool in order to produce a specific product in more details.

Further, a production process can also be monitored. For instance, at least one sensor 225 can be provided for detecting at least one status parameter relating to the production process. For instance, at least one status parameter of the processing unit 204 and/or at least one status parameter of the starting material 218 and/or first product 220 can be detected. The sensor 225 can provide the at least one detected status parameter to the peer-to-peer module 228.

Then, the peer-to-peer module 228 can transmit status parameter relating to the production process to the peer-to-peer application 224. By way of example, status parameter or status data may be whether a particular production process for a first product has not been started yet, is currently started, is already finished or whether a failure is occurred, etc. By writing this kind of status data of a production process into the peer-to-peer application 224, the production process can be monitored and in particular evaluated by the peer-to-peer network 222. For instance, a deviation from a desired production process, such as a delay, can be detected by at least a part of the nodes 226.1, 226.2, 226.3 of the peer-to-peer network 222.

It shall be understood that a production unit may comprise two or more inputs in order to receive two or more (different) starting products to be processed. It shall be further understood that a production unit may have two or more outputs in the case two or more products are produced. Thereby, at least one output may be configured to output waste material or the like.

Further, all input and outputs can be linked to a product. All the data about inputs and outputs can be measured by the system 200 and linked to a smart asset or a smart contract of the produced product 220 via the peer-to-peer application. Data can be stored via the peer-to-peer application 224 in a decentral file storage or a distributed block chain database. With this approach a produced product 220 may have a "digital product memory" about all inputs, outputs, design patterns, production designs, SW deployed, configurations, IP used, payments provided and production activities during the production process and other data characterising the product 220. These data will be signed, (eventually) encrypted and/or stored in the peer-to-peer application 224. An entity, such as a machine or person, can get full product or supply chain transparency. With these data a buyer can prove that a product 220 is an original product produced by e.g. an OEM and not an illegal copy.

Another advantage is that handling and/or monitoring of a product 220 in accordance to GxP requirements can be fully automated. In case GxP requirements (e.g. temperature range for a pharmaceutical product) are breached a new order can be automatically generated or other corrective actions initiated. This has the advantage that costs of poor quality can be further reduced.

Further changes, replenishment, maintenance, status messages, physical conditions or treatments, locations can be stored in the peer-to-peer application 224 to establish a "digital product memory" over the full life cycle of a product 220.

Figure 3:
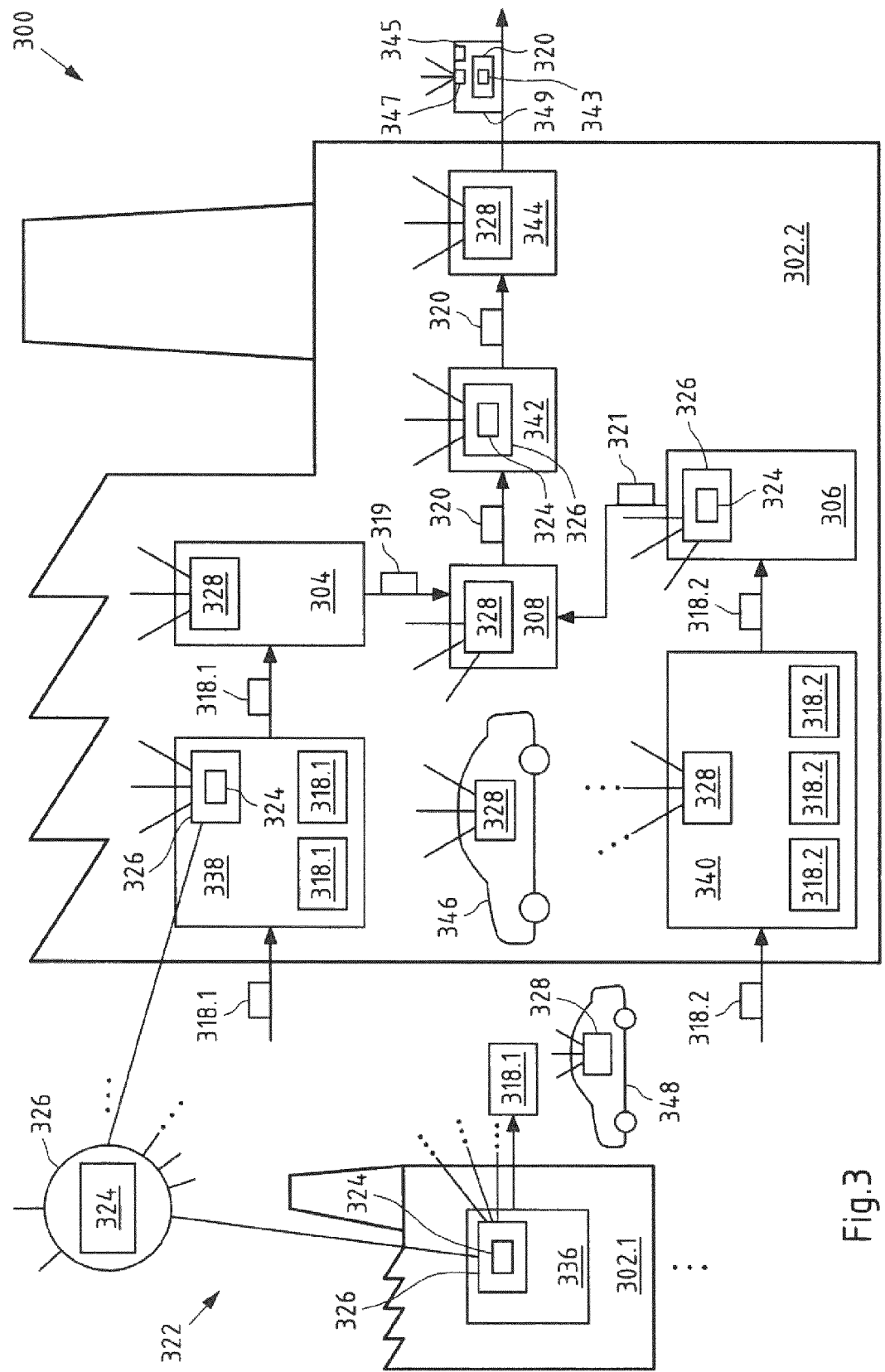
FIG. 3 is a schematic view of a further embodiment of a production system according to the present invention.

FIG. 3 shows a further embodiment of a production system 300 according to the present invention. More particularly, FIG. 3 shows an exemplified production chain from providing a starting product 318.1 until the production and delivering of the first end product 320. The production system 300 comprises two production locations 301.1, 302.2 in form of two factory buildings 301.1, 302.2. The first factory building 302.1 may have a distance (e.g. some kilometres) to the second factory building 302.2. It shall be understood that three or more different production location may be provided.

As can be seen from FIG. 3, in a first production location 302.1, the starting material, such as a raw material, can be provided by a generation unit 336. The generation unit 336 comprises a peer-to-peer module 326 having a peer-to-peer application 324. In other words, the peer-to-peer module 326 of the generation unit 336 is a node 326 of the peer-to-peer network 322. The generation of the raw material, e.g. by mining a raw material, is controlled and/or monitored by a peer-to-peer network 322 providing a peer-to-peer application 324. For a better overview, details of the respective units, such as tools, sensors, controllers, etc., are not shown.

The starting material 318.1 can be supplied to a first storage unit 338 of the second production location 302.2. In particular, the starting material 318.1 can be transported by one or more mobile transport units 348 to the first storage unit 338. Examples of mobile transport units 348 are all vehicles, such as cars, trucks, ships, railway vehicles, planes, bicycles, drones, etc. A mobile transport unit 348 may be (preferably) an autonomous mobile transport unit 348. The depicted mobile transport unit 348 comprises also a peer-to-peer module 328 configured to communicate with the peer-to-peer network 322. It shall be noted that, for a better clarity of the system 300, the connections of the peer-to-peer modules 328, 326 of the peer-to-peer network 322 to each other are only indicated by short lines.

Due to the incorporation of a peer-to-peer module 328 in the mobile transport unit 348, also the transportation of a material/product can be monitored and/or controlled by the peer-to-peer network 322.

The first storage unit 338 may be configured to (intermediately) store the starting material 318.1. There may be at least one further storage unit 340 configured to store at least one further starting material 318.2. Preferably each storage unit 338, 340 may comprise a peer-to-peer module 326, 328. A storage unit 338, 340 can thus be controlled and monitored by the peer-to-peer network 322. For instance, the inventory of a storage unit 338, 340 can be monitored by the peer-to-peer network 322. The status parameter of the inventory can be transmitted to the peer-to-peer application 324. At least some of the peers of the peer-to-peer network 322 can evaluate the status parameter of the first storage unit 338. For instance, if the status parameter indicates that the inventory is almost full (e.g. 90% or more) and/or other status parameter(s) of the production system 300 indicate that the first starting material 318.1 will not be needed in a future time period, the peer-to-peer application 324 may control/inform the generation unit 336 such that the generation of the first starting material 318.1 is reduced and/or delivered to another unit. On the other hand, generation of the starting material 318.1 can be e.g. increased by the peer-to-peer application 324 if the status parameter indicates that the stock is low and/or the demand for the first starting material 318.1 is high. All status information may be based on status parameter(s) provided by the units and/or based on transaction agreements.

Further, the peer-to-peer application 324 can cause transfer of a specific amount of starting material 318.1 from the first storage unit 338 to a first production unit 328 when the first production unit 304 requires the starting material 318.1 e.g. for producing (by a not shown processing tool) a first intermediate product 319. The need of starting material 318.1 can be communicated via the peer-to-peer module 328 of the first production unit 304 to the peer-to-peer application 324. Alternatively or additionally, based on an agreement, the peer-to-peer application 324 can (directly) provide a control data set to the storage unit 338 with instructions to deliver a specific amount of starting material 318.1, a (further) control data set to a mobile transport unit 346 with instructions to transport said amount of starting material 318.1, and a (further) control data set to the production unit 304 with information about the delivering of the material 318.1 and/or instructions for processing said material 318.1.

For transporting the materials 318 and products 319, 321, 320, mobile transport units 346 or (not shown) fixed transport units, such as belts, pipes, and the like can be used. All of these transport units 346 might be equipped with a peer-to-peer module 328.

In a similar way, a second production unit 306 comprising a peer-to-peer module 326 can be configured to produce a second intermediate product 321. In the present example, the first intermediate product 319 and the second intermediate product 321 are supplied to a further production unit 308. The intermediate products 319, 321 are thus starting materials 319, 321 of the further production unit 308. Similar to the above first (and second) production unit 304, the further production unit 308 comprising a peer-to-peer module 326 can be configured to produce a further product 320, in particular, a first end product 320.

The first end product 320 can be forwarded to a quality monitoring unit 342 configured to check/evaluate the quality of the produced first product 320. The quality monitoring unit 342 may comprise at least one quality examination tool (not shown) configured to check the quality of the produced product 320. For instance, an optical sensor can be provided for conducting an optical check of the produced product. Another example of a quality examination tool may be a test tool configured to perform at least one function test of the produced product 320.

Also the at least one quality monitoring unit 342 may be controlled and monitored by using a peer-to-peer module 326 and the peer-to-peer network 322. In particular, the results of the at least one quality product test can be transmitted to the peer-to-peer application 324 by using the peer-to-peer module 326. The peer-to-peer application 324 may be configured to evaluate the received results. Based upon the evaluation, the first product 320 may be forwarded. For instance, if the result of the quality evaluation meets at least one predefined requirement, such as a predefined quality parameter limit, the product 320 can be forwarded to a delivery unit 344. If the at least one predefined requirement is not met, the product 320 can be e.g. reworked by a production unit 304, 306, 308 or if the result is such that a rework cannot remove the lack of quality of the product 320, the product 320 can be scrapped and/or recycled by respective (not shown) scrapping or recycling units. All these (not shown) units may also comprise a peer-to-peer module.

The delivery unit 344 comprising a peer-to-peer module 328 may be configured to prepare the delivery of the produced first product 320 to e.g. the location of the customer of the product 320. According to a preferred embodiment, the produced product 320 can be inserted into a transporting box 349 or package 349 comprising a locking module 345. The locking module 345 may be configured to lock and unlock the transporting box 349. The locking module 345 may comprise an interface module 347 configured to receive release information required to release the locking module 345. Upon receipt of the release information via the interface module 347, the transporting box 349 can be opened and the first product 320 can be removed.

Preferably, the interface module 347 can be a network interface module 347. The network interface module 347, in particular, a peer-to-peer interface module 347 can be configured such that at least a release information can be received or read from the peer-to-peer network 322 and the peer-to-peer application 324, respectively. By way of example, at least a part of the peers 326, 328 of the peer-to-peer network 322 have positively verified the fulfillment of a previously defined delivery condition related to the produced product 320. As a result, the peer-to-peer application 324 may generate a release information. Thereby, the release information can comprise as identification means a unique identification (at least within the peer-to-peer network 322) of the customer of the product 320.

Furthermore, the product 320 (and/or a transporting box/packaging 349 of the product 320 or the like) can be provided with a coding module 343. The coding module 343 can comprise a product identification code generated by the peer-to-peer application 324. For instance, the coding module 343 can be a RFID tag 343. Then, after generating the product identification code for e.g. a generated production (and product transport) transaction agreement (will be explained hereinafter in more details) e.g. the sender 302.2, in particular, the delivery unit 344, of the first product 320 can provide the product 320 with the coding module 343 and/or can write the product identification code into the storage means of the RFID tag 343. For instance, a suitable writing means (not shown) connectable with the peer-to-peer module 328 of the delivery unit 344, wherein the peer-to-peer module 328 is configured to receive the product identification code, can be configured to write the generated product identification code into the storage means of the tag 343.

During the transport of the first product 320 from the delivery unit 344 to the customer, the coding module 343 can be read out by at least one suitable RFID reader. For instance, a mobile transport unit can be provided with a respective (mobile) RFID reader. A RFID reader can comprise a peer-to-peer module at least configured to read the product identification code from the coding module 343 together with e.g. a time stamp and/or location information related to the RFID reader. This information can then be written into the peer-to-peer application 324 by the respective peer-to-peer module. Further data, such as status data of the first product 320 can be read out of the tag 343 and written to the peer-to-peer application 324.

The coding module 343 (e.g. RFID tag) can also comprise information to release the locking module 345. This can be an unlock code encrypted with preferably the public ID of a recipient/customer of the product 320. The recipient can encrypt the information with his private key to get the unlock code. This is especially useful when there is no network access or the peer-to-peer application 324 is (currently) not available to get access to the product 320 or to unlock the locking module 345. A similar approach can be used when handing over products from one mobile transport unit to another mobile transport unit in order to make sure that only authorized mobile transport units handle the product.

In a preferred embodiment, the transport of the starting materials and/or products within the production chain of the system 300 can be monitored and controlled in a similar way.

In another embodiment, the coding module 343 and/or locking module 345 can comprise the peer-to-peer application 324. For instance, the coding module 343 and/or locking module 345 can be at least a light node or a DAPP connected to a remote node. The unlocking process can be controlled by the peer-to-peer application 324.

The coding module 343 and/or locking module 345 may be a single device, such as an enclosure, comprising at least one processing element which can comprise the peer-to-peer application 324.

Furthermore, if the coding module 343 is formed by a RFID tag, the RFID tag, in particular, the stored unique object transport agreement identification can be used as authentication means for access to at least one device in particular along an agreed transport path. For instance, such a RFID tag can enable the access to buildings, areas, vehicle, storage facilities, etc. These devices can have a reading unit which can be connectable to the peer-to-peer network. The reading unit can read out the identification and can transmit the identification together with e.g. an identification of the reading unit or the assigned device to the peer-to-peer application. For instance, the reading unit can comprise the peer-to-peer application or may have a gateway to the peer-to-peer application. After verification by at least a part of the peers of the peer-to-peer application 324, the access to the device can be enabled.

Figure 4:
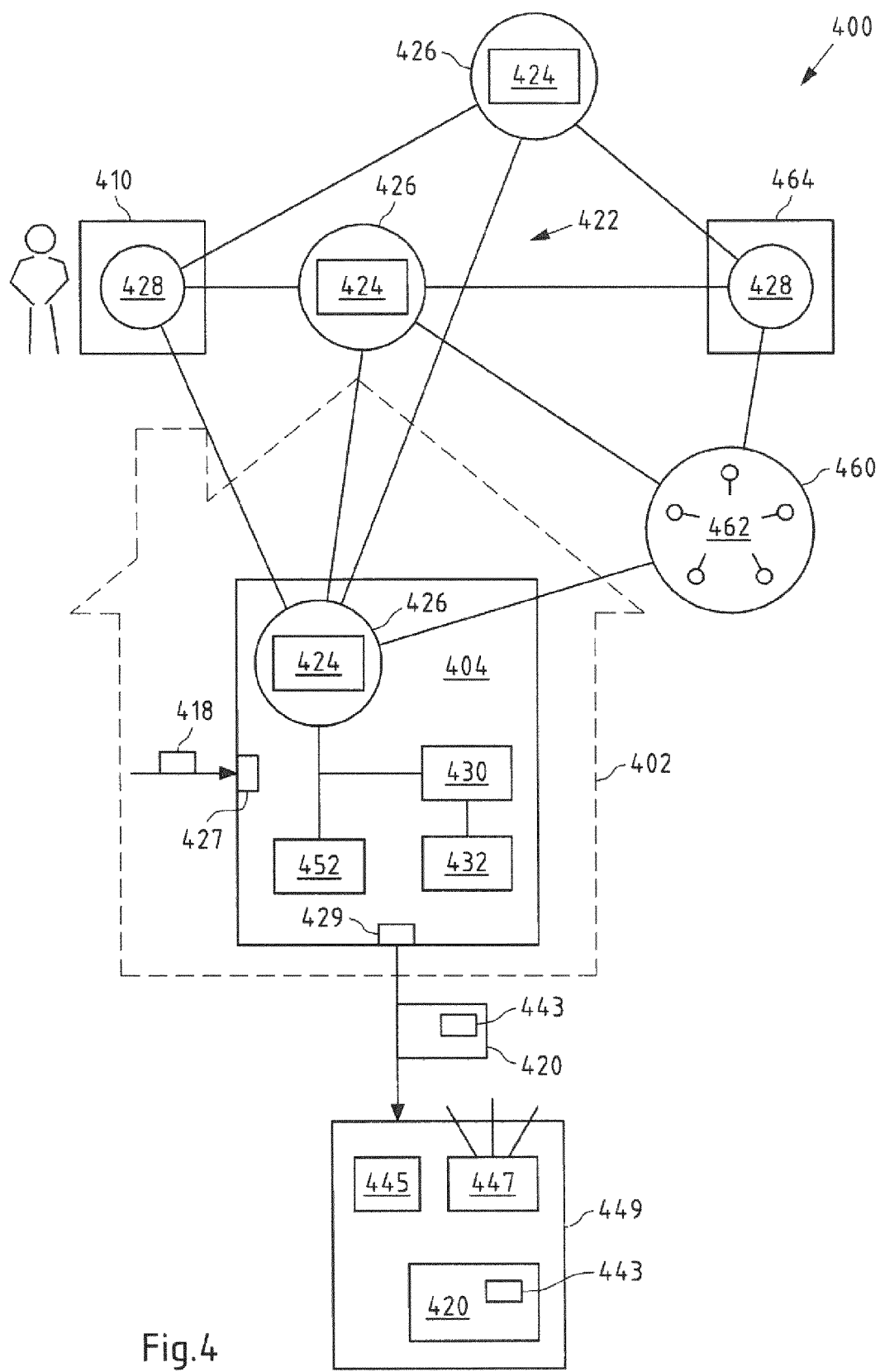
FIG. 4 is a schematic view of a further embodiment of a production system according to the present invention.

FIG. 4 shows a further embodiment of a production system 400 according to the present invention. In the present embodiment, the at least one production unit 404 is located within a building 402, such as a residential building and/or an office building. In the present embodiment, the production unit 404 is a 3D printer 404.

3D printing, also known as additive manufacturing (AM), may refer according to the present application to various processes used to synthesize a three-dimensional product 420. More particularly, the 3D printer 404 may be configured to process a starting material 418 by forming successive layers of the starting material 418 to create the product 420. The processing tool 432 e.g. in form of a printer nozzle set 432 may be controlled by a controller 430 of the 3D printer unit 404. The producible products 420 can be of almost any shape or geometry. The controller 430 may receive a control data set of a 3D model. Based on such a control data set, the controller 430 can control the processing tool 432 such that the desired 3D product corresponding to the 3D model of the control data set is produced. The present 3D printer 404 may be a type of industrial robot.

The at least one starting material 418 may be (by example only) a metal material, ceramic material or a plastic material. The starting material 418 can be supplied to the production unit 404, in particular, to the at least one processing tool 432 by means of an input 427. The produced first product 420 can be output via an output 429. In addition, the production unit 404 comprises an identification applying tool 452 configured to provide the generated product 420 after the production process or during the production process with a product identification coding module 443 having a unique product identification code for the produced product 420.

Further, the 3D printer 404 comprises a peer-to-peer module 426 in form of a node 426 of the peer-to-peer network 422. In particular, in the present embodiment the peer-to-peer module 426 of the 3D printer 404 comprises a peer-to-peer application 424.

The present peer-to-peer network 422 comprises further nodes 426. In addition, the production system 400 comprises a computing device/unit 410 of a customer, wherein the computing device 410, such as a computer, mobile phone, tablet computer, etc., comprises a peer-to-peer module 428. As can be further seen, a file storage 460 in form of a decentral file storage or system 460 is provided. The file storage 460 may comprise a plurality of different 3D control data sets 462 comprising one or more control instructions to create respective 3D products 420.

For instance, the peer-to-peer module 428 can cause the generation of a production transaction agreement about the production of a first product 420 with a provider of the production unit 404 and/or a provider of the respective 3D control data set 462 needed for said first product 420.

The peer-to-peer application 424 can control the production of the first product 420 based on the production transaction agreement. For instance, the peer-to-peer application 424 can cause transmitting of the 3D control data set 462 corresponding to said first 3D product 420 to the controller 430 (e.g. via the peer-to-peer module 426).

Then, the first product 420 is produced according to the received 3D control data set 462. In addition, the identification applying tool 452 can provide the produced product 420 with a product identification coding module 443 having a unique product identification code. The product identification code can be generated and provided by the peer-to-peer application 424. Preferably, the generation of the product identification code can be based on a unique identification code of the customer of the first product 420.

Eventually, the product 420 can be transported to e.g. the customer using a previously described transporting box 449 and one or more mobile transport units.

Prior to a description of preferred embodiments of methods according to the present invention, in the following, the peer-to-peer application and the peer-to-peer network will be described in more details by the aid of FIGS. 5 to 7.

Figure 5:
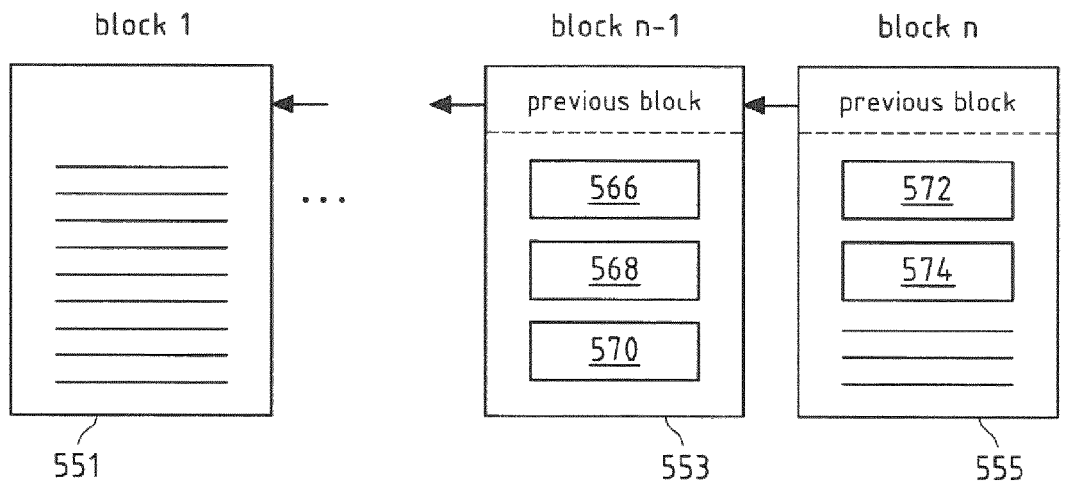
FIG. 5 is a schematic view of an embodiment of a peer-to-peer application according to the present invention.

FIG. 5 shows a schematic view of an embodiment of a peer-to-peer application 524 according to the present invention.

The depicted peer-to-peer application 524 is a register readable, in particular, by the participants of the peer-to-peer network. Thereby, data e.g. in form of messages can be written and/or read into/from the register 524 by a peer-to-peer module of an unit/entity and/or any other participants in the peer-to-peer network. In a preferred embodiment, the peer-to-peer application 524 may be a block chain 524.

Hereinafter, it is assumed in the following description of the present embodiment that the at least one peer-to-peer application 524 is a block chain 524. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In alternative embodiments of the peer-to-peer application the block chain can be a permissionless or permissioned block chain. In a specific case the block chain can be public, consortium or private block chain.

In a further embodiment, the peer-to-peer application can be formed with multiple block chains which are connected via mechanisms such as side chains or smart contracts.

The block chain 524 is formed by at least one block 551, 553, 555, preferably by a plurality of interconnected blocks 551, 553, 555. The first block 551 may also be called genesis block 551. As can be seen, a block 553, 555 (except for the first block 551) refers to each previous block 551, 553. A new block can be created by a computationally intensive process (for example, so called "mining" or through another appropriate process, such as voting) and will be particularly provided to all participants of the peer-to-peer network.

The present block chain 524 is particularly adapted to receive messages from a peer-to-peer module of a previously described production unit, mobile transport unit, delivery unit, storage unit, computing unit or from another peer-to-peer device/unit of another participant of the peer-to-peer network. Further, block chain 524 is particularly adapted to save these messages in the block chain 524. Furthermore, the block chain 524 is configured to generate messages e.g. based on a validation process and/or caused by a peer-to-peer module.

In particular, a (newly) received message can be saved and published in the current block 555 of the block chain 524. Due to the configuration of a block chain 524 as a public register 524, said data message of e.g. a peer-to-peer module of an unit can be read by preferably all participants of the peer-to-peer network or data of the message will be stored on decentral file service or distributed block chain database.

In the present block chain 524 different types of messages and data sets, respectively, for example, within a smart contract (algorithm and/or storage at the block chain 524) can be processed and/or stored. By way of example, the message 570 comprises a generated production transaction agreement.

A production transaction agreement 570 can be e.g. generated between a costumer and a provider of a production unit. An example of a generation of such a production transaction agreement 570 will be described in the following:

For instance, a customer can send by his computing unit comprising a peer-to-peer module a request message 566 to the peer-to-peer application 524. A request message 566 may be characterized in that it can include the following data:

Desired product: product to be produced by one or more production units (e.g. a 3D printer 404) of one or more production unit providers including e.g. input for control data sets such as designs, software to be deployed and customization parameters Time indication: desired reception date of the produced product by the requester Transaction criterion: criterion that must be met by another unit/provider to complete a production transaction agreement about the specified product and time indication The transaction criterion may be e.g. an amount of cryptocurrency to be transferred after a successful production and/or delivery of a product (e.g. from the customer to the provider). Preferably, at least a part of the agreed amount of cryptocurrency can be locked by the peer-to-peer application 524 prior to the delivery of the produced product and/or prior to the start of the production process of the first product. It shall be understood that other transaction criteria can be defined. More information can be, for example, a time stamp, a signature of the sender of the message, a message ID of the transaction and other criteria, such as an indication of the desired production unit types, distance to the location of the production unit, reputation factor of a production unit, service level agreement data, etc.

Another message 568 may be an acceptance message 568. An acceptance message 568 may comprise identical or at least similar data details as compared with a request message 566. Additionally, the acceptance message 568 can comprise a reference indication to a previous request, such as the ID of the request message 566. For example, it can be listed in an acceptance message 568 in relation to a request message 568 that a certain and desired product can be produced and delivered to the requester until the time indication with the at least one transaction criterion.

The product may be an intermediate product or a similar product of the requested product. The specified time may also be a part-time or sub-time. It can also be given a lower/higher transaction criterion. If an acceptance message 568 includes only an intermediate product or a similar product of the requested product, a part-time indication and/or a lower, higher or other transaction criterion, the acceptance message 568 can be called a counter-offer message. This can be accepted by the peer-to-peer module of the requester through an acceptance message. Based on this a peer-to-peer module (e.g. of the computing unit of the requester) may cause the generation of a production transaction agreement 570.

In particular, there can be multiple request messages and/or accepting messages and/or messages comprising a requested product/offered product for different transaction criterions. Each unit can give guidelines, according to which at least one product transaction agreement can be generated. In a preferably automated, such as iterative process, each request message can be associated to an optimally corresponding acceptance message. The block chain 524 may also be configured to generate, based on the messages of a peer-to-peer module, a production transaction agreement 570.

A production transaction agreement 570 may be stored within a smart contract 570 in a block 553. A smart contract

570 may comprise computer program code. In the product transaction agreement 570, in particular, the production and delivery of at least one desired product until a certain time point and/or a transaction criterion as a given price can be agreed between a first unit of a customer and another unit of a production unit provider, such as of a 3D printer 404. The product transaction agreement 570 may comprise the at least one required control data set and/or at least a location information about the storage location of the respective control data set.

For example, with reference to FIG. 4, the first unit 410 can cause the other unit 404 by means of the block chain 524 to generate an agreement that the production unit 404 produces and delivers a particular 3D product 420 until a particular time point (tx) to the requester e.g. using at least one mobile transport unit. Corresponding production transaction agreements may be generated in other systems.

The generated smart contract 570 can cause transmitting of a particular control data set in order to produce the desired product of the production transaction agreement 570. By way of example, a control data set message 572 can be generated and read e.g. by the peer-to-peer module of the production unit. In an alternative embodiment, the smart contract 570 can provide access data (e.g. access key) to the peer-to-peer module of the production unit. The peer-to-peer module of the production unit or another communication unit of the production unit can access a (decentral) file storage comprising the particular control data set to produce the desired product by using the received access data.

The file storage can be configured such that an access to a particular control data set is only enabled if the accessing module has access data which are valid for said control data set. For instance, suitable cryptographic means can be included in the access data for decrypting and at least reading the specific control data set.

In a further alternative embodiment, the smart contract 570 can cause transmitting a control data set from the file storage to the production unit. For instance, the smart contract 570 can cause the file storage to transmit the required control data set to the production unit, as agreed in the production transaction agreement.

In a preferred embodiment, it may be possible that the processing tool of the production unit is directly driven and controlled based on said control data set without storing the control data said in a memory of the production unit.

In an alternative embodiment a private contract computation can be used in combination with a measured launch environment or a secure hardware enclave for attestation and/or sealing. A control data set may be stored and decrypted in the enclave which is directly controlling the production process. After the production process is done the control data is overwritten in the memory by e.g. random numbers or other data. By using zk-Proof Systems it can be checked that the data are erased in the device to prevent fraud.

Another message 574 can be a process status message 574 comprising (current) status data (at least one status parameter) about a specific production process. The at least one peer-to-peer module of the at least one production unit (preferably each peer-to-peer module of each unit, e.g. production unit, storage unit, mobile transport unit, quality monitoring unit, etc., involved in the production of the desired product) can write detected status parameter values relating to the production of said product into the block chain 524, such as message 574.

On the one hand, a peer-to-peer module of the customer can read this message 574. Hence, the customer is always informed about the current status of the production process of the desired product. On the other hand, each unit involved in the production of said product is always informed about the current status of the production process. This enables to optimize the production process. In particular, the handover of e.g. an intermediate product or end product from one unit to another unit can be improved since all units are always informed about the current status of the production process.

Further, the status data 574 can be checked by the peer-to-peer application and/or the participants of the peer-to-peer network. For instance, it can be checked whether the provided status data indicates a correct processing of the desired product, e.g. as agreed in the agreement 570.

Also messages and amendments of messages can be verified by the peer-to-peer network, in particular, the participants of the peer-to-peer network.

In particular, the peer-to-peer application 524 is configured to save the messages 566 to 574 in a tamper-proof manner. This is done essentially by the fact that through the entire peer-to-peer network, for example, an agreement or message or status parameter or the like can be verified by the cumulative calculation power of the entire peer-to-peer network.

Preferably, at least the above described messages, such as the agreements and other messages, can be hashed together in pairs in a block of the block chain by a Merkle tree. In particular, only the last hash value, the so-called root hash, is noted as a checksum in the header of a block. Then, the block can be coupled with the previous block. Chaining of the blocks can be performed using this root hashes. Each block can include the hash of the entire previous block header in its header. This makes it possible to clearly define the order of the blocks. In addition, this may also prevent the subsequent modification of previous blocks and the messages stored in the previous blocks, since, in particular, the hashes of all subsequent blocks would have to be recalculated in a short time.

In addition, data feeds can be provided by the peer-to-peer application (so called smart oracles, e.g. information about prices of materials, etc.).

The block chain might comprise further data sets, such as one or more production schedule(s), as will be described hereinafter.

Figure 6:
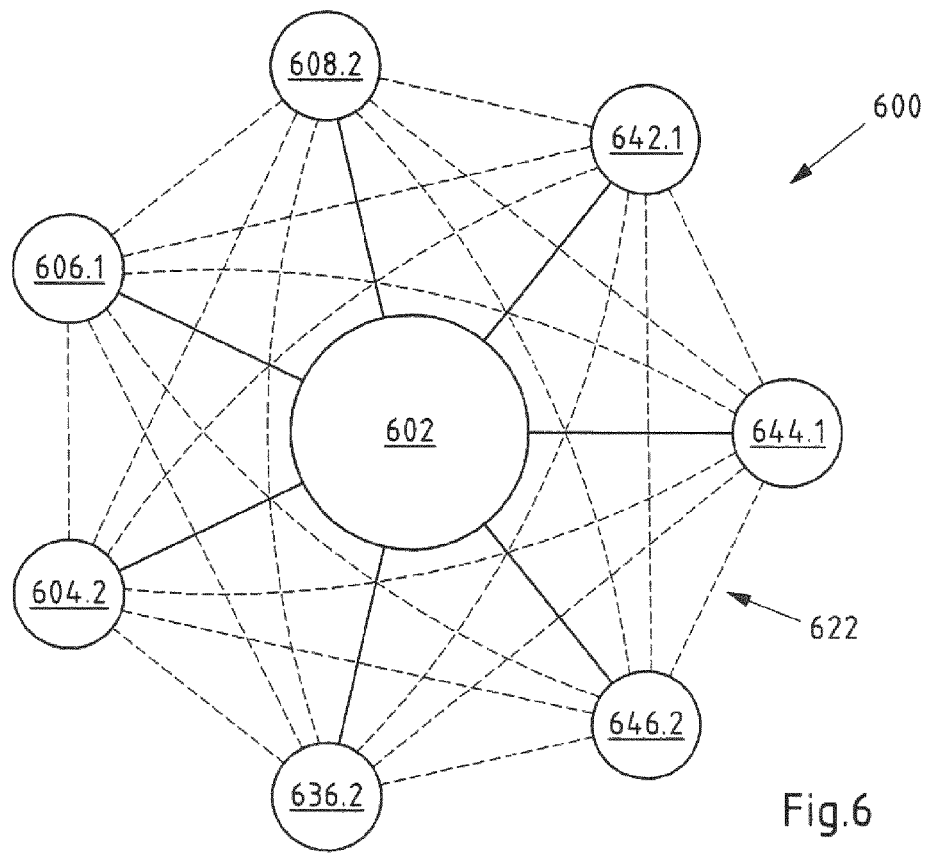
FIG. 6 is a schematic view of a further embodiment of a production system according to the present invention.

FIG. 6 shows a schematic view of another embodiment of a production system 600 of the invention. In the present embodiment only nodes and participants 604.2 to 646.2 of the peer-to-peer network 622 are shown. In the present example, it is assumed that all nodes 604.2 to 646.2 comprise the peer-to-peer application (not shown).

The nodes 604.2, 606.1, 608.2 may be production units and the peer-to-peer modules of the production units, respectively. The node 642.1 may be realized by a peer-to-peer module integrated in a quality monitoring unit. Node 644.1 may be the peer-to-peer module of a delivery unit. Further node 646.2 may be a mobile transport unit. Node 636.2 may be realized by a generation unit comprising a peer-to-peer module.

As can be seen, two different types of peers or node computers 606.1, 642.1, 644.1 and 604.2, 608.2, 646.2, 636.2 are presently illustrated. All peers 606.1, 642.1, 644.1 and 604.2, 608.2, 646.2, 636.2 are comprised by the peer-to-peer network 622. In the present embodiment, however, only a part of the peers 606.1, 642.1, 644.1 and 604.2, 608.2, 646.2, 636.2, in the present case, the peers 606.1, 642.1, 644.1, check the validity of the data stored in the peer-to-peer application messages, such as the status data, agreements, request messages, and the like. Furthermore, only a part of the entire peers can be configured to store the peer-to-peer application and/or only a part of the peers can be configured to execute the algorithms of a smart contract. Since the validation/verification of e.g. identification data requires a considerable computational effort, it may be advantageous for reasons of efficiency, if only a part of the peers 606.1, 642.1, 644.1, especially particularly powerful peers 606.1, 642.1, 644.1, perform the validation and/or optimization algorithms taking more complex pricing or the state of the production system network into consideration.

Validation and optimization can be done on-chain or off-chain. Off-chain validation and/or optimization can be managed by the peer-to-peer application, like the code on the block chain. Powerful means in particular a high computing power. In other words, in the present case a valid entry in the peer-to-peer application, such as a block chain, is assumed if (only) a part of the peers 606.1, 642.1, 644.1 comes to a positive result. It shall be understood that only a single, especially particularly powerful peer can perform the validation and/or optimization process.

Similarly, in an alternative (not shown) embodiment a particularly large peer-to-peer network may be divided in two or more clusters. In a corresponding peer-to-peer network, for example, a validation will only be carried out by the members of one cluster (e.g. sharing of a block chain to improve the scalability). In a further embodiment the peer-to-peer application can be formed using multiple block chains. These block chains are connected via frameworks such as sidechains.

Figure 7:
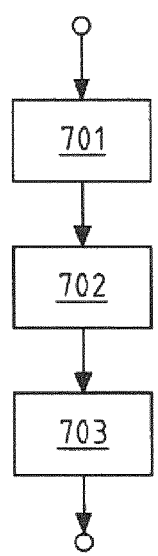
FIG. 7 is a diagram of an embodiment of a method according to the present invention.

FIG. 7 shows a diagram of a first embodiment of a method according to the present invention. In a first (optional) step 701, a production transaction agreement is provided by the peer-to-peer application. The production transaction agreement may comprise a smart contract causing the transmission of a control data set (or even provides access to control data sets from a design pattern or SW market) to at least one production unit in a step 702. In particular, the transmission is performed by providing a control data set to the production unit by means of the peer-to-peer module of the production unit.

Then, the at least one processing tool of the at least one production unit is controlled based on this control data set in step 703. By way of example, a controller of the production unit controls the at least one processing tool based on the provided control data set. It may also be possible that a processing tool is remotely controlled e.g. by means of the peer-to-peer application or file storage. In other words, the at least one product is produced in step 703 based on the provided control data set.

Figure 8:
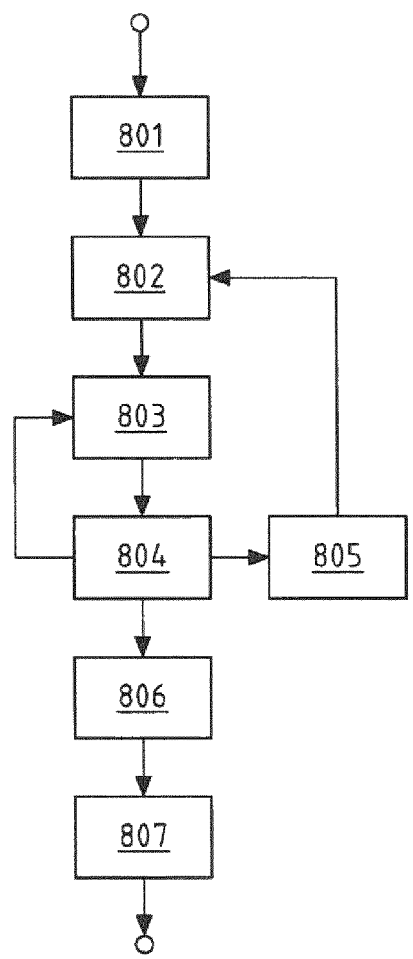
FIG. 8 is a diagram of a further embodiment of a method according to the present invention.

FIG. 8 shows a further embodiment of a method according to the present invention. In a first step 801, a peer-to-peer module of a computing unit of a customer can cause the generation of a production transaction agreement. E.g. based on an iterative process and by means of the peer-to-peer application, a production transaction agreement at least about the production of at least one first product can be generated.

More particularly, after a previously performed registration process, by means of a registered peer-to-peer module the generation of a production transaction agreement can be caused.

In order to become a participant of a peer-to-peer network, any unit performs a registration process set by the participants of the peer-to-peer network. Preferably, each unit or entity can be registered in the peer-to-peer application as e.g. a so called smart asset.

According to a preferred embodiment of the present invention, a peer-to-peer module may be configured to cause a registration of the unit or entity in the peer-to-peer application by transmitting a registering message comprising at least an (unique) identification assigned to the unit. The identification might be a serial number of e.g. the mobile transport unit or production unit, the user's name or address, etc. At least in the latter case, the peer-to-peer application may be configured to generate a unique peer-to-peer identification for the requesting unit. In particular, the peer-to-peer application may register the respective units or entities by storing at least the peer-to-peer identification in the peer-to-peer application or a database controlled by the peer-to-peer application.

Prior to the registration of a unit or the like, at least part of the peers of the (already existing) peer-to-peer network may check/validate whether the at least one registering requirement predefined by the peer-to-peer network is met by the requesting unit. In order to perform the check, preferably, further data may be included in the registering message. In particular, the peers of the peer-to-peer network may provide registering rules or registering requirements which must be fulfilled by an unit to be regarded as a trustful unit. By way of example, each unit to be registered must comprise an account and/or a particular amount of a cryptocurrency. Other rules/requirements may be individually defined by the peers of a peer-to-peer network. E.g. it may be necessary that a new unit must be recommended by an unit which is already a participant of the peer-to-peer network. In addition, it may be necessary that this participant must have a reputation factor which increases a predefined minimum reputation factor.

Furthermore, it may be advantageous if in the registering process also technical details of the at least one unit and/or the production system can be stored together with the respective peer-to-peer identification in the peer-to-peer application or the database accessible by the peer-to-peer application. Example of technical details may be a maximum transport capacity of a mobile transport unit, maximum capacity of a storage unit, capabilities of a production unit, maximum processing velocity of a production unit, etc. Since the peer-to-peer application provides respective technical details, a production process for producing the first product can be adapted and optimized in time, quality, customer requests, etc. It shall be understood that the previously described embodiment is not limited to a particular embodiment of the present application.

Referring back to FIG. 8, a production transaction agreement can be generated based on a respective initiation of e.g. the peer-to-peer module of a user's computing unit. In one embodiment, such a production transaction agreement is generated between the respective units of a user/customer and production service provider. In other embodiments, further units/entities may be involved. For instance, one or more production service provider (including providers of mobile transport units) may be additionally involved. For instance, if a material/product has to be transported between two locations, a transport transaction agreement about the transport of the material/product can be (additionally) generated between the respective units of the provider of the mobile transport unit and the customer and/or production service provider. In such an agreement, the following information can be comprised:

Product/material specification: Product/material to be transported (e.g. details of properties of an object)

Time indication: e.g. due date, until the Product/material should be delivered to a receiving unit, such as a production unit or customer's unit Location indication: address of the sending unit and/or receiving unit (e.g. desired pick-up and delivery addresses)

Transport criterion: criterion that must be met by the transport provider unit to complete an object transport agreement Further criteria (SLA) Max/minimum delivery time, physical requirements, insurance It shall be understood that other transaction criteria can be defined. Further, more information can be, for example, a time stamp, a signature of the sender of the message, a message ID of the transaction and other criteria, such as an indication of the desired type of mobile transport unit to be used, etc.

In another example, the production service provider controls and offers one or more production unit/s (e.g. 3D printer). However, a control data set, e.g. a 3D control data set, needed for producing a specific 3D product by said 3D printer of the production service provider is owned by a control data set provider. In this case, a control data set transaction agreement can be generated between the respective units of the control data set provider and the customer and/or production service provider.

In such an agreement, the following information can be comprised:

Control data set specification: Unique identification of the desired control data set Receiving production unit: Unit which will receive the control data set in order to produce the desired product Time indication: Time, at which the control data set must be provided to the at least one production unit Usage limitation: Limitations about the use of the control data set (for instance time limitation or limitation of the number of usage (limitation of the number of producible products))

It shall be understood that the previously described and other agreements can be part of the production transaction agreement (for instance, sub-agreements of the production transaction agreement) and/or separate agreements.

As described hereinbefore, the production transaction agreement can comprise—besides optional control data set transaction agreement/s and/or transport transaction agreement/s—a desired product specification, time indication and/or transaction criterion.

Further, a production schedule of the production process of the desired product can be generated. For instance, based on the availability of the involved unit/s and preferably prior or during the generation of the production transaction agreement the production schedule can be generated. The production schedule may comprise a time line with starting and end time points for each unit involved in said production process. Further, the production schedule may comprise information about the tasks to be performed by preferably each involved unit during starting and end time points.

In a further embodiment priorities in the production process can be defined. Priorities and/or time slots can be sold and traded via a means of the peer-to-peer application, such as a smart contract (transaction agreement market). A product with the requirement of being delivered very fast can buy a higher priority and production will start earlier. Or if there is a production bottle neck a production system can pay an entity, such as a user, smart contract or machine, to cancel the production order or move the production order to a different time or provide an alternative production offer or change the priorities. These markets production flexibilities and priorities can be (automatically) traded to further optimize a production system.

After the generation of such an agreement, in a next step 802, the peer-to-peer application can cause the transmission of at least one control data set to at least one production unit, as defined in the agreement. Preferably, by means of the peer-to-peer application and the respective peer-to-peer module/s, each unit involved in the production process can be at least informed about the agreed production of said product. For instance, each unit can be informed about the respective task/s assigned to the respective units and the scheduled start and end time points of the respective task/s according to the production schedule. In this process step, it shall be understood that the asset including its identification can be registered on the peer-to-peer application (smart asset) or a smart contract for the asset can be set up to enable production chain transparency, digital product memory and/or ownership of the product. It shall be understood that the identification of the product may be generated and stored in the peer-to-peer application in the process step as well. The identification can be generated by the peer-to-peer application as well by using for example means such as collision free hash algorithms. It shall be understood that this registration of the asset and/or setting up a smart contract on the peer-to-peer application (e.g. block chain) can also happen at a later process step.

Then, in step 803, the production process is performed according to the generated production schedule. Preferably, during the production process each peer-to-peer module of in particular each involved unit can transmit status parameter(s) relating to the production process to the peer-to-peer application. For instance, a production unit can transmit status parameter(s) about its current functionality, its current stock of a starting material, the current production process, etc. preferably regularly to the peer-to-peer application.

The peer-to-peer application, in particular at least one of the peers of the peer-to-peer network, is configured to evaluate the provided status parameter(s) (step 804). In particular, it can be evaluated whether the production of the particular product is performed in accordance with the production schedule and/or one or more other requirements of the generated production transaction agreement. If a deviation is not detected, it can be prosecuted with step 803 or 806.

If a deviation is detected, the production process and its production schedule can be adapted (step 805). For instance, if a particular production unit is currently not available, e.g. due to a functional error, the peer-to-peer application looks for an alternative production unit which can step in for the not available production unit. Further amendments can result from this amendment, such as amendments regarding mobile transport units. Another adaption might be a change of the priority of e.g. two different actions to be conducted by a production unit.

After the end product has been created and e.g. delivered to the requesting customer, in step 806, the performance of the involved units can be analyzed and evaluated.

More particularly, according to a preferred embodiment, the peer-to-peer application may comprise a reputation store and/or may be configured to access a reputation store. The reputation store may comprise at least the peer-to-peer identification of at least one of a registered unit, such as a production unit, mobile transport unit, etc., together with a reputation factor assigned to the respective unit. Generally, the peer-to-peer application may be configured to update the at least one reputation factor based on a validation result, preferably a plurality of validation results.

For instance, status data of a production process can be analyzed by the peer-to-peer network and used for updating reputation factors. By way of example, if the status data indicates that a product with high quality has been produced and/or that the production of said product has been conducted in the scheduled time, a reputation factor of said unit can be increased while a reputation factor can be reduced if the status data indicate that the quality was low and/or a set time limit was not met. In addition, further information, such as feedback data about the satisfaction of the units involved in a production process, e.g. from a customer, can be provided by at least one peer-to-peer module to the peer-to-peer application. Also this data can be used for adapting reputation factors.

The reputation system can be provided by the peer-to-peer application to preferably all participants of the peer-to-peer network. E.g. a computing unit of a customer or of another entity, such as a provider, can select a production unit, mobile transport unit, etc. based on the (current) reputation factor assigned to the respective unit/s.

It shall be understood that step 806 can also be performed at least partly parallel to steps 803 to 805. For instance, a particular production unit can be evaluated and its reputation factor can be adapted (directly) after the termination of its task in the production process.

Furthermore, after a successful production of a product, at least one peer-to-peer module can be configured to cause a conduction of a transaction criterion transaction based on a transaction criterion specified in the production transaction agreement (step 807). Preferably, depending on a successful delivery of a product, a peer-to-peer module may be arranged to cause a conduction of a transaction criterion transaction. For example, a certain amount of a cryptocurrency can be established as a transaction criterion. In the case the production and/or delivery of the product was carried out according to the production transaction agreement, by means of peer-to-peer network, in particular by the peer-to-peer application, the specified amount can be transferred in a transaction criterion transaction. Similarly as described above, also in this transaction unique keys of the peer-to-peer modules can be used for verification. The keys and in particular the actual possession of the amount by a peer-to-peer module or associated unit can be verified by the peer-to-peer network, such as described above. A secure and automated payment by means of a peer-to-peer network, smart contracts and/or deposits without central authority can be provided. Transaction costs can be further reduced.

It shall be understood that in other variants, step 807 can be conducted at an earlier stage, e.g. prior to the start of the production process. For instance, the production process may only start if the specified amount or at least a part of the specified amount has been transferred.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A production system, comprising:
   at least one production unit configured to produce at least one first product;
   wherein the at least one production unit comprises at least one processing tool configured to process at least one starting material supplyable to the at least one production unit in order to produce the at least one first product;
   wherein the at least one production unit comprises at least one peer-to-peer module configured to communicate with at least one peer-to-peer application of at least one peer-to-peer network with a plurality of computer nodes, wherein the at least one peer-to-peer application is a decentralized register able to be read by at least each computer node of the at least one peer-to-peer network, wherein the decentralized register stores computer code that can be invoked by a transaction to an address of the computer code in a smart contract, wherein a message or transaction sent to a smart contract will start the execution of the computer code of the smart contract while using data stored in the smart contract;
   wherein each of the computer nodes of the at least one peer-to-peer network comprises the at least one peer-to-peer application;
   wherein client/server participation is excluded in the at least one peer-to-peer application within the at least one peer-to-peer network;
   wherein the smart contract comprised by the at least one peer-to-peer application is configured to cause transmitting of at least one first control data set to the at least one production unit;
   wherein the at least one processing tool is controllable in accordance with the at least one transmitted first control data set;

wherein the at least one production unit comprises at least one sensor configured to detect at least one status parameter regarding a production process of the at least one first product;
wherein the at least one peer-to-peer module of the at least one production unit is configured to transmit at least the detected at least one status parameter to the at least one peer-to-peer application; and
wherein the plurality of computer nodes of the at least one peer-to-peer network are configured to monitor the production process based on the transmitted at least one status parameter by means of the at least one peer-to-peer application.

2. The production system according to claim 1, wherein the at least one peer-to-peer application is configured to cause transmitting of the at least one first control data set to the at least one production unit based on a production transaction agreement stored in the at least one peer-to-peer application.

3. The production system according to claim 1, wherein the production system comprises a file storage configured to store at least the at least one first control data set;
wherein the at least one first control data set comprises at least one instruction to produce the at least one first product;
wherein access to the at least one first control data set is controlled by the at least one peer-to-peer application.

4. The production system according to claim 3, wherein at least the at least one first control data set is encrypted by at least one first encryption key;
wherein the at least one peer-to-peer application is configured to cause transmitting of at least one first access key corresponding to the at least one first encryption key to the at least one peer-to-peer module of the at least one production unit based on a production transaction agreement stored in the at least one peer-to-peer application;
wherein the at least one peer-to-peer module is configured to access the first control data set based on the received at least one first access key.

5. The production system according to claim 1, wherein the production system comprises further at least one of:
a mobile transport unit configured to transport at least the starting material and/or the at least one first product;
a storage unit configured to store at least the starting material and/or the at least one first product;
a quality monitoring unit configured to monitor at least the quality of the starting material and/or the quality of the at least one first product;
a building automation unit configured to control at least one building function.

6. The production system according to claim 5, wherein the mobile transport unit comprises at least one peer-to-peer module configured to communicate with the at least one peer-to-peer application;
wherein the mobile transport unit is controllable by means of the at least one peer-to-peer application;
and/or
the storage unit comprises at least one peer-to-peer module configured to communicate with the at least one peer-to-peer application;
wherein the storage unit is controllable by means of the at least one peer-to-peer application;
and/or
the quality monitoring unit comprises at least one peer-to-peer module configured to communicate with the at least one peer-to-peer application;
wherein the quality monitoring unit is controllable by means of the at least one peer-to-peer application.

7. The production system according to claim 1, wherein at least one of the plurality of computer nodes of the at least one peer-to-peer network is configured to evaluate the transmitted at least one status parameter; and
wherein the at least one peer-to-peer application is configured to control the at least one production unit based on the evaluation result of the transmitted at least one status parameter.

8. The production system according to claim 1, wherein the at least one peer-to-peer module of the at least one production unit is further configured to receive a unique product identification code from the at least one peer-to-peer application; and
wherein the at least one production unit comprises at least one identification applying tool configured to provide at least the at least one first product with the received unique product identification code.

9. The production system according to claim 1, wherein the production system further comprises at least one transporting box having at least one locking module configured to lock the at least one transporting box;
wherein the at least one transporting box is configured to receive at least the at least one first product; and
wherein the at least one locking module comprises an interface module configured to receive a release information provided by the at least one peer-to-peer application causing the release of the at least one locking module.

10. The production system according to claim 1,
wherein the at least one peer-to-peer application is configured to store data with given certain proofs or signatures.

11. The production system according to claim 1, wherein the at least one peer-to-peer application is a block chain or decentral ledger comprising at least two blocks coupled to each other.

12. The production system according to claim 1, wherein at least a part of the plurality of computer nodes and/or participants of the at least one peer-to-peer network is/are configured to validate at least one message received and/or generated by the at least one peer-to-peer application.

13. A method for operating a production system, the method comprising:
causing, by at least one smart contract comprised by at least one peer-to-peer application, transmitting of at least one first control data set to at least one production unit, and
processing at least one starting material by at least one processing tool of the at least one production unit in accordance with the transmitted at least one first data set in order to produce at least one first product;
detecting at least one status parameter regarding a production process of the at least one first product;
transmitting at least the detected at least one status parameter to the at least one peer-to-peer application by at least one peer-to peer module; and
monitoring the production process by a plurality of computer nodes of at least one peer to peer network based on the transmitted status parameter by means of the at least one peer-to-peer application;
wherein each of the plurality of computer nodes of the at least one peer to peer network comprises the at least one peer-to-peer application;

wherein client/server participation is excluded in the at least one peer-to-peer application within the at least one peer-to-peer network; and wherein the at least one peer-to-peer application is a decentralized register able to be read by at least each computer node of the at least one peer-to-peer network, wherein the decentralized register stores computer code that can be invoked by a transaction to the address of the computer code in the smart contract, wherein a message or transaction sent to the smart contract will start the execution of the computer code of the smart contract while using data stored in the smart contract.

14. A non-transitory, machine readable storage medium having stored thereon a peer-to-peer application of a peer-to-peer network with a plurality of computer nodes, wherein each of the computer nodes of the peer to peer network comprises the peer-to-peer application, wherein client/server participation is excluded in the peer-to-peer application within the peer-to-peer network, and wherein the at least one peer-to-peer application is a decentralized register able to be read by at least each computer node of the at least one peer-to-peer network, wherein the decentralized register stores computer code that can be invoked by a transaction to an address of code in a smart contract, wherein a message or transaction sent to a smart contract will start the execution of the code of the smart contract while using data stored in the smart contract, the peer-to-peer application comprising:

the smart contract for causing transmission of at least one control data set to at least one production unit; and means for monitoring a production process of a first product by at least a part of the computer nodes of the peer to peer network based on a status parameter regarding the production process of the first product, transmitted by a peer-to-peer module of the at least one production unit, by means of the peer-to-peer application.

15. A method, comprising:

utilizing the non-transitory, machine readable storage medium having stored thereon a peer-to-peer application according to claim 14 for controlling at least one production unit wherein the at least one production unit comprises:

at least one input configured to receive at least one starting material;

at least one processing tool configured to process the at least one starting material in order to produce at least one first product;

at least one peer-to-peer module configured to communicate with at least one peer-to-peer application of at least one peer-to-peer network;

wherein the at least one processing tool is controllable in accordance with at least one received first control data set;

wherein transmission of the at least one received first control data set is causable by the at least one peer-to-peer application;

at least one sensor configured to detect at least one status parameter regarding the production process of the at least one first product;

wherein the at least one peer-to peer module is configured to transmit at least the detected at least one status parameter to the at least one peer-to-peer application.

16. The method of claim 15, wherein the at least one production unit is a three dimensional printer.

* * * * *

UNITED STATES PATENT AND TRADEMARK OFFICE
CERTIFICATE OF CORRECTION

| | |
|---|---|
| PATENT NO. | : 11,683,368 B2 |
| APPLICATION NO. | : 16/148480 |
| DATED | : June 20, 2023 |
| INVENTOR(S) | : Carsten Stöcker |

It is certified that error appears in the above-identified patent and that said Letters Patent is hereby corrected as shown below:

In the Claims

Column 37, Line 21 Claim 14, reads, "read by at least each computer node of the at least one" and should read -- read by at least each computer node of the --

Signed and Sealed this
Eighth Day of August, 2023

Katherine Kelly Vidal
*Director of the United States Patent and Trademark Office*